US011757988B2

(12) United States Patent
Basu et al.

(10) Patent No.: US 11,757,988 B2
(45) Date of Patent: Sep. 12, 2023

(54) ADD AND DROP BLOBBERS IN BLOCKCHAIN

(71) Applicant: 0Chain Corp., Cupertino, CA (US)

(72) Inventors: Saswata Basu, Cupertino, CA (US); Thomas Howard Austin, San Jose, CA (US)

(73) Assignee: 0CHAIN CORP., Cupertino, CA (US)

( * ) Notice: Subject to any disclaimer, the term of this patent is extended or adjusted under 35 U.S.C. 154(b) by 303 days.

(21) Appl. No.: 17/349,556

(22) Filed: Jun. 16, 2021

(65) Prior Publication Data

US 2021/0314395 A1    Oct. 7, 2021

(51) Int. Cl.
| | | |
|---|---|---|
| H04L 29/06 | (2006.01) | |
| H04L 67/104 | (2022.01) | |
| G06Q 20/06 | (2012.01) | |
| H04L 9/06 | (2006.01) | |
| H04L 9/08 | (2006.01) | |
| H04L 9/32 | (2006.01) | |
| G06Q 20/22 | (2012.01) | |
| H04L 9/40 | (2022.01) | |
| H04L 9/00 | (2022.01) | |

(52) U.S. Cl.
CPC ......... *H04L 67/1059* (2013.01); *G06Q 20/06* (2013.01); *G06Q 20/0658* (2013.01); *G06Q 20/223* (2013.01); *H04L 9/0637* (2013.01); *H04L 9/0643* (2013.01); *H04L 9/0841* (2013.01); *H04L 9/0894* (2013.01); *H04L 9/3236* (2013.01); *H04L 9/3297* (2013.01); *H04L 63/1466* (2013.01); *H04L 9/50* (2022.05); *H04L 2209/56* (2013.01)

(58) Field of Classification Search
CPC . H04L 67/1059; H04L 9/0637; H04L 9/0643; H04L 9/0841; H04L 9/0894; H04L 9/3236; H04L 9/3297; H04L 63/1466; H04L 9/50; H04L 2209/56; H04L 63/10; G06Q 20/06; G06Q 20/0658; G06Q 20/223
See application file for complete search history.

(56) References Cited

U.S. PATENT DOCUMENTS

| | | | | |
|---|---|---|---|---|
| 10,282,554 B2* | 5/2019 | Seger, II | ............... | G06F 21/602 |
| 2018/0248701 A1* | 8/2018 | Johnson | ................ | H04L 9/3247 |
| 2019/0058581 A1* | 2/2019 | Wood | .................... | H04L 9/0637 |
| 2021/0073804 A1* | 3/2021 | Kikinis | ............. | G06Q 20/3276 |
| 2022/0261882 A1* | 8/2022 | Youb | .................... | G06Q 20/065 |

* cited by examiner

*Primary Examiner* — Mahfuzur Rahman
(74) *Attorney, Agent, or Firm* — Levine's Tech Consulting LLC; Frank E. Levine

(57) ABSTRACT

An approach is disclosed to replace or by-pass a first blobber utilizing a blockchain infrastructure. The first blobber is identified. For replacement, a second blobber is identified and a replacement transaction is written. Write markers with respect to content for the second blobber are generated. The content is transferred to the second blobber. After detecting a successful completion of all the writes to the second blobber, a transaction to drop the first blobber is written. When the first blobber is by-passed content written to the first blobber capable of being reconstructed from other blocks is written to other blobbers. Read markers are sent for the other blocks to the other blobbers. The blockchain monitors for successful completion of all reads of the other blocks. After detecting the successful completion of all the reads of the other blocks from the other blobbers, the content is reconstructed from the other blocks.

20 Claims, 12 Drawing Sheets

ADD AND DROP BLOBBERS IN BLOCKCHAIN

If an Application Data Sheet (ADS) has been filed for this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a utility application related to and claims the benefit of priority from U.S. Provisional Patent Application No. 62/707,177 filed on Oct. 24, 2017.

BACKGROUND

The present invention relates to a computing environment, and more particularly adding and dropping blobbers on blockchain platform.

SUMMARY

According one embodiment of the invention, there is a method that includes a processor and a local storage device accessible by the processor executing a request to substitute a first blobber with a second blobber utilizing a blockchain infrastructure. The first blobber to be substituted is identified and a transaction is written to the blockchain platform to replace the first blobber. The second blobber to replace the first blobber is identified. A content to be written to the second blobber is identified. Write markers with respect to content for the second blobber are generated. The content is transferred to the second blobber. After detecting a successful completion of all the writes to the second blobber, a transaction to drop the first blobber is written to the blockchain platform.

According to one embodiment of the invention, there is a method that includes a processor and a local storage device accessible by the processor of bypassing usage of a first blobber in a blockchain platform. The first blobber to by-pass usage is identified where a content written to the first blobber is capable of being reconstructed from other blocks written to other blobbers in the allocation associated with the first blobber. Read markers are sent for the other blocks to the other blobbers. The blockchain monitors for successful completion of all reads of the other blocks. After detecting the successful completion of all the reads of the other blocks from the other blobbers, reconstructing the content from the other blocks.

According to one embodiment of the invention, there is provided an information handling system including at least one processor executing instructions implementing steps of the method that executes a request to substitute a first blobber with a second blobber The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
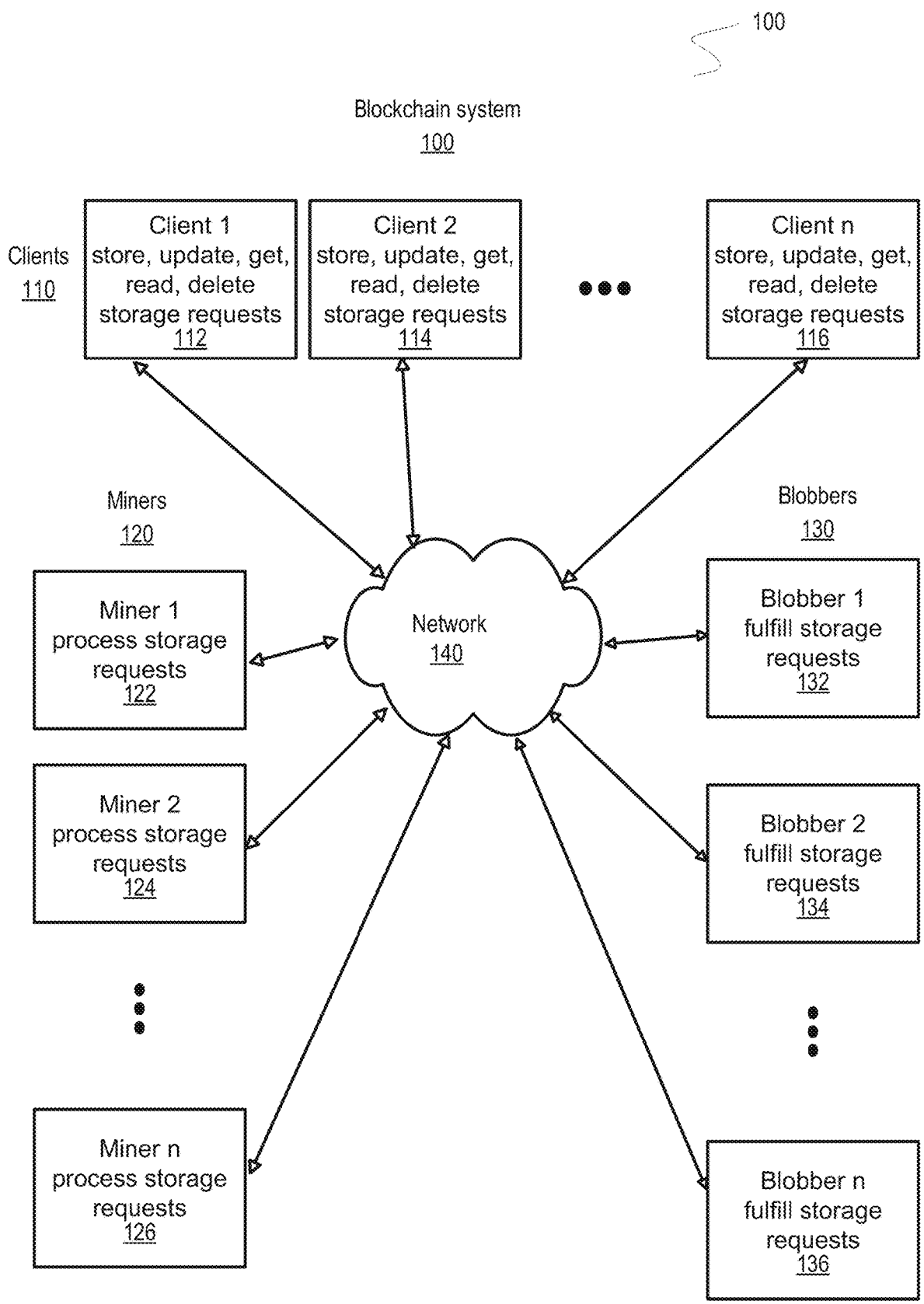
FIG. 1 illustrates an embodiment of a blockchain system according to the present disclosure.

Blockchain technology, sometimes also referred to as "blockchain," is a particular type of distributed database. Blockchains can theoretically be used to store any type of data or content, but are particularly well-suited to environments in which transparency, anonymity, and verifiability are important considerations. Examples include financial projects, such as cryptocurrencies, auctions, capital management, barter economies, insurance lotteries, and equity crowd sourcing.

A blockchain, originally block chain, is a growing list of records, called blocks, that are linked using cryptography. Each block contains a cryptographic hash of the previous block, a timestamp, and transaction data (generally represented as a Merkle tree). The Merkle tree is a hash-based data structure that is a generalization of the hash list. It is a tree structure in which each leaf node is a hash of a block of data, and each non-leaf node is a hash of its children. Typically, Merkle trees have a branching factor of 2, meaning that each node has up to 2 children.

By design, a blockchain is resistant to modification of its data. This is because once recorded, the data in any given block cannot be altered retroactively without alteration of all subsequent blocks. For use as a distributed ledger, a blockchain is typically managed by a peer-to-peer network collectively adhering to a protocol for inter-node communication and validating new blocks. Although blockchain records are not unalterable, blockchains may be considered secure by design and exemplify a distributed computing system with high Byzantine fault tolerance. A Byzantine fault is a condition of a computer system, particularly distributed computing systems, where components may fail and there is imperfect information on whether a component has failed. The blockchain has been described as "an open, distributed ledger that can record transactions between two parties efficiently and in a verifiable and permanent way."

The technology is perhaps most easily understood through a simple and familiar example, such as "Bitcoin," a cryptocurrency. A cryptocurrency is not entirely dissimilar from conventional currencies and, like a traditional currency, is essentially a medium of exchange. Traditional currencies are represented by a physical object paper currency or minted coins, for example—which is "spent" by physically delivering it in the proper denominations to a recipient in exchange for a good or service.

However, for long-distance transactions, such as buying goods or services over the Internet, direct physical delivery is not feasible. Instead, the currency would have to be mailed to the recipient. However, this carries a very high risk of fraud. The recipient may simply keep the money and not deliver the purchased good or service, leaving the buyer without recourse. Instead, on-line transactions are typically carried out using electronic payment systems in which the transaction is processed, validated, and mediated by a trusted third party. This third party may be a bank, as in the case of a debit or credit card, or a third party service functioning as an escrow agent, such as PayPal. Crypto currencies operate on this same principle, except that instead of using a financial institution or other third party to facilitate the transaction, the transaction is verified through a consensus reached via cryptographic proof.

Internet is a global computer network providing a variety of information and communication facilities, comprising interconnected networks using standardized communication protocols. Internet is not owned by a single entity and it operates without a central governing body. The same principles of distributed governance were applied to digital currencies by providing ability to perform digital transactions that existed without support from any underlying institution. The digital ledger that records the transactions in a chain using a mathematical hierarchy is called a blockchain.

The current blockchain platform and related applications known to the industry fall short in multiple ways. First, there is no separation of roles on the blockchain based on the role of an entity for a given transaction. Each transaction follows a strict chain of rules and is dependent on its preceding transaction. If one transaction fails, all subsequent transactions on the blockchain become unusable. The computing time and built in delay in any blockchain platform is dependent on the available computing resources of its nodes. In absence of a role model, a single node has several computing intense tasks that are slow to execute. A slow system becomes vulnerable and becomes open to attacks. The current solutions do not allow for client flexibility in developing distributed applications with immutability and finality of transactions on a blockchain platform.

In order to overcome the deficiencies of the prior art, various methodologies are disclosed where an infrastructure is supplied to enable usage of the disclosed methodology. In an embodiment, application programming interfaces (API) are provided to handle the details where examples are available on the Ochain platform. For this disclosure, high level descriptions of the details are discussed which should be adequate for those with ordinary skill in the art to implement solutions. In this disclosure, support for the identified features may be identified as modules in the blockchain platform with embodiments as described herein embedded in the modules.

The following definitions generally apply to this disclosure and should be understood in both the context of client/server computing generally, as well as the environment of a blockchain network. These definitions, and other terms used herein, should also be understood in the context of leading white papers pertaining to the subject matter. These include, but are not necessarily limited to, Bitcoin: A Peer-to-Peer Electronic Cash System (Satoshi Nakamoto 2008). It will be understood by a person of ordinary skill in the art that the precise vocabulary of blockchains is not entirely settled, and although the industry has established a general shared understanding of the meaning of the terms, reasonable variations may exist.

The term "network" generally refers to a voice, data, or other telecommunications network over which computers communicate with each other. The term "server" generally refers to a computer providing a service over a network, and a "client" generally refers to a computer accessing or using a service provided by a server over a network. The terms "server" and "client" may refer to hardware, software, and/or a combination of hardware and software, depending on context. The terms "server" and "client" may refer to endpoints of a network communication or network connection, including but not necessarily limited to a network socket connection. A "server" may comprise a plurality of software and/or hardware servers delivering a service or set of services. The term "host" may, in noun form, refer to an endpoint of a network communication or network (e.g., "a remote host"), or may, in verb form, refer to a server providing a service over a network ("hosts a website"), or an access point for a service over a network. It should be noted that the term "blockchain network" as used herein usually means the collection of nodes interacting via a particular blockchain protocol and ruleset. Network nodes are the physical pieces that make up a network. They usually include any device that both receives and then communicates information. But they might receive and store the data, relay the information elsewhere, or create and send data instead.

The term "asset" means anything that can be owned or controlled to produce value.

The term "asymmetric key encryption," also known as "public key encryption," "public key cryptography," and "asymmetric cryptography," means a cryptographic system that uses pairs of mathematically related keys, one public and one private, to authenticate messages. The "private key" is kept secret by the sending of a message or document and used to encrypt the message or document. The "public key" is shared with the public and can be used to decrypt the message or document.

The term "ledger" means the append-only records stored in a blockchain. The records are immutable and may hold any type of information, including financial records and software instructions.

The term "blockchain" means a distributed database system comprising a continuously growing list of ordered records ("blocks") shared across a network. In a typical embodiment, the blockchain functions as a shared transaction ledger.

The term "transaction" means an asset transfer onto or off of the ledger represented by the blockchain, or a logically equivalent addition to or deletion from the ledger.

The term "blockchain network" means the collection of nodes interacting via a particular blockchain protocol and rule set.

The term "nonce" means an arbitrary number or other data used once and only once in a cryptographic operation. A nonce is often, but not necessarily, a random or pseudo-random number. In some embodiments, a nonce will be chosen to be an incrementing number or time stamp which is used to prevent replay attacks.

The term "block" means a record in a continuously growing list of ordered records that comprise a blockchain. In an embodiment, a block comprises a collection of confirmed and validated transactions, plus a nonce.

The term "hash" means a cryptographic algorithm to produce a unique or effectively unique value, properly known as a "digest" but sometimes informally referred to itself as a "hash," usually from an arbitrary, variable-sized input. Hashes are repeatable and unidirectional, meaning the algorithm always produces the same digest from the same input, but the original input cannot be determined from the digest. A change to even one byte of the input generally results in a very different digest, obscuring the relationship between the original content and the digest. SHA256 (secure hash algorithm) is an example of a widely used hash.

The term "mining" means the process by which new transactions to add to the blockchain are verified by solving a cryptographic puzzle. In a proof-of-work blockchain network, mining involves collecting transactions reported to the blockchain network into a "block," adding a nonce to the block, then hashing the block. If the resulting digest complies with the verification condition for the blockchain system (i.e., difficulty), then the block is the next block in the blockchain.

The term "miner" refers to a computing system that processes transactions. Miners may process transactions by combining requests into blocks. In embodiments, a miner has a limited time, for example, 15-50 milliseconds, to produce a block. Not all miners generate blocks. Miners that generate blocks are called "generators." Miners may be ranked and chosen to perform transactions based on their ranking. Some limited number of miners may be chosen to perform validation. All miners must be registered on the blockchain. The mining process involves identifying a block that, when hashed twice with SHA256 yields a number smaller than the given difficulty target. While the average work required increases in inverse proportion to the difficulty target, a hash can always be verified by executing a single round of double SHA-256. For the bitcoin timestamp network, a valid proof-of-work is found by incrementing a nonce until a value is found that gives the block's hash the required number of leading zero bits. Once the hashing has produced a valid result, the block cannot be changed without redoing the work. As later blocks are chained after it, the work to change the block would include redoing the work for each subsequent block. Majority consensus is represented by the longest chain, which required the greatest amount of effort to produce. If a majority of computing power is controlled by honest nodes, the honest chain will grow fastest and outpace any competing chains. To modify a past block, an attacker would have to redo the proof-of-work of that block and all blocks after it and then surpass the work of the honest nodes. The probability of a slower attacker catching up diminishes exponentially as subsequent blocks are added.

Messages representing generated blocks are sent to all miners by identifying the block with a block hash, transaction hash, and a signature of the minor producing the block. The miners receiving the messages replay the transactions for the block and sign an authentication message. If there is enough miners authenticating the block, consensus ticket it signed. In some embodiments a ⅔+1 agreement or 67% agreement is needed to generate the consensus ticket.

The term "sharding" is a technique in blockchain that seeks to achieve scalability within a blockchain network. The process of sharding seeks to split a blockchain network into separate shards, that contain their own data, separate from other shards.

The term "sharder" refers to a computing system that that keeps tracks of its blockchain history. They are a single source of truth regarding any given transaction.

The term "transaction fee" means a fee imposed on some transactions in a blockchain network. The amount of the transaction fee is awarded to the miner who successfully mines the next block containing that transaction.

The term "wallet" means a computer file or software of a user that allows a user of a blockchain network to store and spend cryptocurrency by submitting transactions to the blockchain network. A wallet is usually itself protected by cryptography via a private key.

The term "consensus" refers to a computational agreement among nodes in a blockchain network as to the content and order of blocks in the blockchain.

The term "digital signature" means a mathematically-based system for demonstrating the authenticity of a message or document by ensuring that it was sent from the identified sender and not tampered with by an intermediary. Blockchains generally use asymmetric key encryption to implement digital signatures.

The term "fork" means a split in a blockchain where two different valid successor blocks have been mined and are present in the blockchain, but consensus has not yet been reached as to which fork is correct. This type of fork is also referred to as a "soft fork," and is automatically resolved by consensus over time. A "hard fork" is the forced imposition of a fork by manual intervention to invalidate prior blocks/transactions, typically via a change to the blockchain rules and protocol.

The term "cryptocurrency" (or "crypto") is a digital currency that can be used to buy goods and services, but uses an online ledger with strong cryptography to secure online transactions. Much of the interest in these unregulated currencies is to trade for profit, with speculators at times driving prices skyward. There are currently many different types of cryptocurrencies offered by many different blockchain implementations. The usage of any given cryptocurrency may be represented herein as "tokens."

The term "genesis block" means the very first block in a blockchain, that is, the root of the Merkle tree.

The term "proof-of-stake" means a mining system in which the production and verification of a block is pseudo-randomly awarded to a candidate miner, or prioritized list of candidate miners, who have invested a valuable stake in the system which can be collected by the blockchain network if the produced block is later deemed invalid. The stake functions as a deterrent against fraudulent blocks.

The term "proof-of-work" means a mining system in which the difficulty of finding a nonce that solves the cryptographic puzzle is high enough that the existence of a block compliant with the verification rules is itself sufficient proof that the block is not fraudulent.

The term "smart contracts" means computer programs executed by a computer system that facilitate, verify, or enforce the negotiation and performance of an agreement using computer language rather than legal terminology. Smart contracts may be verified and executed on virtual computer systems distributed across a blockchain.

The terms "web," "web site," "web server," "web client," and "web browser" refer generally to computers programmed to communicate over a network using the HyperText Transfer Protocol ("HTTP"), and/or similar and/or related protocols including but not limited to HTTP Secure ("HTTPS") and Secure Hypertext Transfer Protocol ("SHTP"). A "web server" is a computer receiving and responding to HTTP requests, and a "web client" is a computer having a user agent sending and receiving responses to HTTP requests. The user agent is generally web browser software.

The terms "erasure code" is a forward error correction (FEC) code under the assumption of bit erasures (rather than bit errors), which transforms a message of k symbols into a longer message (code word) with n symbols such that the original message can be recovered from a subset of the n symbols. The fraction r=k/n is called the code rate.

The term "database" means a computer-accessible, organized collection of data, which may be referred to as "content" in this document. Databases have been used for decades to format, store, access, organize, and search data. Traditionally, databases were stored on a single storage medium controlled by a single computer processor, such as a fixed disk or disk array. However, databases may also be organized in a "distributed" fashion, wherein the database is stored on a plurality of storage devices, not all of which are necessarily operated by a common processor. Instead, distributed databases may be stored in multiple component parts, in whole or part, dispersed across a network of interconnected computers. "Difficulty" means proof-of-work mining, or the expected total computational effort necessary to verify the next block in a blockchain. Difficulty is generally determined by the verification rules of the blockchain and may be adjusted over time to cause the blockchain to grow (e.g., new blocks to be verified and added) at a desired rate. For example, in the Bitcoin blockchain network, the difficulty adjusts to maintain a block verification time of about ten minutes across the blockchain network.

It will be understood by one of ordinary skill in the art that common parlance in the computing industry refers to a "user" accessing a "site." This usage is intended to represent technical access to an online server by a user via a user computer. That is, the reference to a "user" accessing a "server" refers to the user manipulating or otherwise causing client software to communicate over a telecommunications network with server software. This also typically means that the user's client software is running on a client computer system and accessing the server computer system remotely. Although it is possible that a user may directly access and use the server via the server hardware, and without use of a client system, this is not the typical use case in a client/server architecture.

The systems and methods described herein enable a user in a rewards- or points-based system implemented via a blockchain network, to purchase a content according to a terms of a smart contracts. Users can receive, store, and share or send rewards on-demand in exchange for receiving the content. However, the user need not directly use, or even be aware of, the underlying blockchain.

Described herein are systems and methods for an on-line, verifiable payment system that facilitates both manual and automatic payment with transaction costs as small as fractions of a cent. The systems and methods include a financial accounting system that uses smart contract technology and a centralized authority performing blockchain transactions on behalf of multiple independent users, and using bulk processing of transactions to reduce substantially the associated transaction fees, in some cases to fractions of a penny.

One key distinction of the disclosed data storage system from other blockchain storage solutions is the separation of the role of mining from that of providing storage. Computers that provide storage are referred to as blobbers. Blobbers are neither responsible nor required to perform mining. In this manner, the load is lightened on the mining network and enables fast transactions on a lightweight blockchain. As the client and blobber interact, the client generates special signed receipts called markers. These markers act like checks that the blobber can later cash in with the blockchain.

Once the interaction between client and blobber has concluded, the blobber writes an additional transaction to the blockchain, which redeems the markers for tokens, that is, the platform cryptocurrency, and commits the blobber to a Merkle root matching the data stored. The leaves of the Merkle tree must match markers sent from the client, preventing either the client or the blobber from defrauding each other.

After a file has been stored, a challenge protocol ensures both that the blobber continues to store the file and continues to be paid for that work. The mining network posts a transaction, challenging the blobber to prove that it still possesses the data that it was paid to store. The blobber must provide that data, the relevant system metadata, and the client-signed marker to prove that the right data is stored. The blobber is then rewarded or punished accordingly.

With the disclosed design, the majority of the work between clients and blobbers happens off-chain. The mining network is only involved enough to ensure that clients pay blobbers for their work and that the blobbers are doing the work that they have been paid to do. This approach assumes that the client is using erasure codes to ensure greater resiliency. While this is not a strict requirement, it does enable a client to recover if a blobber proves to be unreliable.

In an embodiment, the split-key wallet protocol uses a Boneh-Lynn-Shacham (BLS) signature scheme that is based on bi-linear pairings. A pairing, defined as e(,), is a bilinear map of 2 groups G1 and G2 in some other group, GT. e(,) takes e as arguments points in G1 and G2.

Pairings that verifies a signature have the form: $e(g1, sig)=e(pk, H(m))$ (in expanded form: $e(g1, sk*H(m))=e(sk*g1, H(m))=e(g1, sk*H(m))$ $H(m)$ is hashing a message to a point on an elliptic curve.

BLS has:

KeyGen—choose a random a. Given generator $g1$, $pk=\alpha*g1$

Sign—$\sigma=\alpha*H(m)\in G2$ (in the case of eth2.0)

Verify(pk,m, $\sigma$)—if $e(g1, \sigma)=e(pk, H(m))$ return true.

The BLS signature scheme may be used to split keys and let users interact using crypto keys via a blockchain. Since the cryptocurrency balance is maintained against these keys, it's very important to protect the private key. The private key is split into two secondary keys, storing each of the secondary key on a different device. Signing requires individual signatures from each device. Hence, losing any one device can still protect the primary key. In addition, if desired, one of the secondary keys can be further split into two parts, only one of which is stored on the device and the other may be a simple PIN that the user has to enter each time. This provides an extra layer of protection in case both devices are compromised. The split-key wallet protocol makes it easy to generate as many split keys as desired providing the ability for the user to periodically rotate the split keys and in the process change the PIN.

With cryptocurrency, some quantity of tokens may be locked. In an embodiment, support may be provided for selling the cryptocurrency by specifying a name for locks, keys to the locks, how long each key is valid (from seconds to centuries), a number of keys, a price of the keys. Tokens acquired may be "locked" for the time each key is valid.

Agreement Negotiation. The client and blobber must negotiate a price for writes and a price for reads, both in terms of tokens/gigabyte of data. Other criteria may be negotiated between the client and blobber as needed, allowing the blockchain to serve as a public record of their agreement. Once terms have been established, the client writes a transaction to the blockchain with the terms of their agreement. This transaction is called "the storage agreement transaction." The storage agreement transaction may include:
1) The id of the client (client_id).
2) The id of the blobber (blobber_id).
3) The allocation_id identifying this storage allocation, referring to the data that the blobber stores for the client. This globally unique ID is a function of client_id, blobber_id, and a timestamp.
4) The tokens of reward paid to the miner per gigabyte read (read_price).
5) The tokens of reward paid to the miner per gigabyte uploaded (write_price).
6) A params field for any additional requirements.
7) The signatures of both the client and blobber.
8) Offer expiration time, to ensure that the client does not invoke an old agreement that is no longer profitable for the blobber.
9) Storage duration, determining how long the blobber needs to provide storage. After this period has elapsed, the blobber no longer needs to store the client's files; of course, the client and blobber can negotiate to extend the storage period. From the perspective of the blockchain, the renewal is treated as a completely new agreement and no special support is needed. The client can generate a write marker to pay the blobber for files that the blobber is already storing.

The storage agreement transaction may also initializes a read counter and write counter for the client and blobber to use in their interactions, both initially set to 0. These values increase with each transaction depending on the amount of data uploaded or downloaded. By calculating the last counter value with the new counter value, the amount of reward the blobber has earned is easily determined.

The storage agreement transaction also creates two new pools: 1) The blobber reward pool, containing the interest that the client generated as the rewards for the blobber to store and serve data. 2) The challenge pool; when the blobber verifies that it is storing the data, it may receive some portion of the reward stored in this pool.

When the funds in the blobber reward pool are depleted, the client may lock additional tokens to add funds to them. The challenge pool is initially empty, but gains tokens with every write that the client does. (Reads, in contrast, are paid to the blobber directly.)

In the storage contract transaction, the client locks tokens and pays the interest to the blobber reward pool. These tokens represent the blobber's pay for storing the client's data. A portion of these funds are allocated for the validators. Blobbers are paid for every file uploaded, and they are expected to store the files until the end of the contract period negotiated with the client. (A client can elect to delete files stored with the blobber but does not receive any refund for doing so). Note that they are not paid immediately. The funds are set aside in the challenge pool; the blobber receives tokens from this pool upon satisfying a challenge to prove that they are actually storing the data.

Challenge protocol: In order to verify that a blobber is actually storing the data that they claim they store, the disclosed protocol relies on the miners periodically issuing challenge requests to the blobbers. This mechanism is also how blobbers are rewarded for storing files, even if the files are not accessed by any clients. When the blobber passes the challenge, they receive newly minted tokens.

The actual verification is done by a group of machines called the validators. The validators can be any group of machines, depending on what makes sense in the blockchain ecosystem. Validators are mutually untrusting. In an embodiment, the validators may be a distinct group of machines from the miners and blobbers.

At a high level, the challenge protocol involves three phases: 1) The mining network randomly selects the blobber data allocation to be challenged. This process also specifies the validators who will verify the challenge and provides a random seed to be used for the challenges. This stage is referred to as the challenge issuance. 2) In the justification phase, the blobber broadcasts the data to the validators along with the metadata needed to verify the challenge. 3) Finally, in the judgment phase, the validators share their results. Once the validators have agreed on the results of the challenge, they write a transaction to the blockchain indicating whether the test passed. This transaction also pays the validators and rewards the blobber.

Selecting validators is a particular challenge. In a cronyism attack, a blobber sends the data to a friendly validator who approves all challenges without validating the data. In an extortion attack, a validator demands additional compensation from the blobber in exchange for passing the challenge.

These attacks are avoided by having the mining network randomly select a set of validators. For a challenge to pass, at least N validators must approve the results of the challenge. The difference between these values must be narrow enough to make a successful cronyism attack unlikely, but high enough to prevent an extortion attack. An additional concern is that the validators actually do the verification work. A validator who does not do the work but who attempts to collect the reward is called a freeloader.

Challenge Issuance Phase: The mining network must initially post a transaction to the network by randomly challenging a blobber providing storage. This challenge issuance transaction may include: 1) The allocation of data challenged, identified by allocation_id. Note that this should implicitly identify which blobber is challenged. 2) The list of eligible validators. 3) A random seed, which determines the indices of the data blocks in that allocation that the blobber must provide. 4) The latest write marker at the time of the challenge. Conceptually, this challenge issuance transaction is comparable to a roulette wheel, where the number of tokens currently due to the blobber from its challenge pool dictates its number of slices on the wheel. An alternate approach would be to use the size of the data allocation instead, but this can lead to a subtle attack. A blobber could post an agreement for a negligible price with itself as the client, and then commit to storing large amounts of easily regenerated data. With a commitment to a large enough amount of data, other blobbers would be challenged only with a low probability. By tying the probability of being challenged to the amount of tokens in the challenge pool, this attack becomes prohibitively expensive to carry out. The initial transaction essentially locks a portion of the blobber's stake and reward in a sub-pool specific to this challenge. A "guilty until proven innocent" approach is used to prevents a blobber from attempting a denial-of-service attack against a validator in order to avoid punishment. If the blobber never satisfies the challenge, the tokens are effectively burned.

Justification Phase: When the blobber observes the challenge issuance on the blockchain, it broadcasts its proof of storage to the validators with: The file system metadata. The write marker proving that file system contents match what is stored on the blockchain. The challenged blocks of data are chosen pseudo randomly using the miner's random seed and the Merkle paths of those data blocks.

Once the validators receive the blobber's data, they each verify the data that they have been sent. The validator verifies that: The file system metadata is valid. The file system root hash matches the write marker. The write marker matches the most recent commitment to the blockchain. At this point, the validator has established that the blobber's metadata is valid and matches the blockchain. The validator then calculates the number of blocks on the system from the allocation size. Using the random seed, the validator verifies that the blobber's blocks correspond with the pseudorandom sequence. (This serves to make every block of data on the system equally likely to be challenged, and ensures that the blobber did not try to game the results).

For each data block, the blobber verifies that the Merkle path matches up to the file metadata. As part of this process, the validator stores the two penultimate hashes of the Merkle tree; that is, it stores the two hashes that can be hashed together to give the file's Merkle root. These two hashes are called the validation proof.

At most one of the hashes in the validation proof should have been provided by the blobber. (To ensure this behavior, the inclusion of additional hashes on the Merkle path is an automatic failure.) Therefore, the validator must have done the work to calculate at least one of the two hashes. This validation proof can be verified easily by the other validators. These proofs are an important part of the disclosed defense against freeloaders.

Judgment Phase: After the validator has completed its work, it broadcasts the signed hash of its results. This signed hash is called the pre-commit. The hash format is H=hash (validationProof List_R), where validation Proof List is a list of the hash pairs serving as validation proofs for each file, and R is a randomly chosen nonce selected by the validator.

The validator then waits to collect the pre-commits for the other validators. Once the timeout period has been reached, it broadcasts its validProof List and its R value to publish its results. No additional pre-commits are accepted at this point. (If less than the minimum number of required signatures is received, it will rebroadcast and wait again).

The validator accepts the signatures of all other validators with valid proofs. provided that the other validators submitted valid pre-commits. Since the results are not publicly observable until after the results are completed, a freeloader is not able to provide a valid pre-commit. Each validator submits a transaction to the blockchain with its results. The smart contract accepts the first transaction it receives, and only the first. At this point, the blobber receives its reward and the validators receive payment for their work. The payout amount is pro-rated to match the total payout and the length of the contract. For instance, if blobber Bob's challenge pool contains 12 tokens from Alice for storage paid over a contract period of 90 days, and the first challenge happens at day 45, Bob receives 6 tokens for passing the challenge. If Bob is again challenged at day 60, Bob receives an additional 2 tokens. On day 90, Bob receives the remaining balance of 4 tokens.

The validators are paid in a pro-rated manner like the blobber is rewarded. An equal portion of the reward is set aside for every validator, even those that did not participate in the validation. However, the rewards are only distributed to validators who participated in the validation process; the reward for non-participating validators is burned. This design ensures that validators have no incentive to exclude each other; instead validators have a strong incentive to perform the validation work.

Challenge Failures: With the challenge protocol, blobbers could be the victim of a denial-of-service attack when they are challenged. An attacker interested in damaging the network could target challenged blobbers, potentially destroying the blobbers' rewards and staked tokens, until no blobbers are willing to provide the service. As a result, there is no time-out period for challenges. The blobber could contact the validators to complete the challenge at any time. This choice creates a misalignment of incentives, since validators are only paid on successful challenges, and hence might be motivated to collude with a cheating blobber. To address this concern, blobbers are allowed to broadcast a signed confession indicating that they are unable to satisfy the challenge. The validators can then write this message to the blockchain and receive their rewards for their validation work. This transaction releases a portion of the blobber's stake back to them. The client owning the data then receives back the token rewards and the rest of the challenged blobber's stake. With this design, a blobber caught cheating that acts in its own best interests will reward the other parties in the system.

The systems and methods described herein enable a user in a rewards- or points-based system implemented via a blockchain network, to purchase a content according to a terms of a smart contracts. Users can receive, store, and share or send rewards on-demand in exchange for receiving the content. However, the user need not directly use, or even be aware of, the underlying blockchain.

Described herein are systems and methods for an on-line, verifiable payment system that facilitates both manual and automatic payment with transaction costs as small as fractions of a cent. The systems and methods include a financial accounting system that uses smart contract technology and a centralized authority performing blockchain transactions on behalf of multiple independent users, and using bulk processing of transactions to reduce substantially the associated transaction fees, in some cases to fractions of a penny.

One key distinction of the disclosed data storage system from other blockchain storage solutions is the separation of the role of mining from that of providing storage. Computers that provide storage are referred to as blobbers. Blobbers are neither responsible nor required to perform mining. In this manner, the load is lightened on the mining network and enables fast transactions on a lightweight blockchain. As the client and blobber interact, the client generates special signed receipts called markers. These markers act like checks that the blobber can later cash in with the blockchain.

Once the interaction between client and blobber has concluded, the blobber writes an additional transaction to the blockchain, which redeems the markers for tokens, that is, the platform cryptocurrency, and commits the blobber to a Merkle root matching the data stored. The leaves of the Merkle tree must match markers sent from the client, preventing either the client or the blobber from defrauding each other.

After a file has been stored, a challenge protocol ensures both that the blobber continues to store the file and continues to be paid for that work. The mining network posts a transaction, challenging the blobber to prove that it still possesses the data that it was paid to store. The blobber must provide that data, the relevant system metadata, and the client-signed marker to prove that the right data is stored. The blobber is then rewarded or punished accordingly.

With the disclosed design, the majority of the work between clients and blobbers happens off-chain. The mining network is only involved enough to ensure that clients pay blobbers for their work and that the blobbers are doing the work that they have been paid to do. This approach assumes that the client is using erasure codes to ensure greater resiliency. While this is not a strict requirement, it does enable a client to recover if a blobber proves to be unreliable.

When clients lock tokens, they are rewarded with an "interest." The interest is newly generated crypto-currency tokens, intended (but not required) for payment of services on the network. These services can be miner compensation for transaction processing, blobber compensation for storage, or transmitted to any other client in exchange for a service; facilitating a lucrative market for building and running distributed applications. In the event of network congestion, a client may also offer to lock a greater amount of tokens to ensure that their transaction is accepted by the mining network. The token reward protocol creates an economy where the tokens can be used to receive services for "free"—meaning, the client does not lose their initial stake, but still adequately compensates the service provider.

The systems and methods of a blockchain platform for distributed applications includes separation of roles for a miner and a blobber. The message flow model between different parties including a client, a blobber and a miner allows for fast transactions on a lightweight blockchain by lightening the load on a mining network, i.e. a network of one or more miners. Offloading the work to a different group of machines allows for greater specialization in the design and specifications of the machines, allowing for the blockchain platform miners to be optimized for fast transaction handling and blockchain platform blobbers to be efficient at handling data for given transaction types.

In one embodiment, the distributed application is a storage application. Users of the system can request and get storage access without relying on a single source. While the distributed application described herein in detail is a storage application, a person of ordinary skill in the art would understand and apply the same invention disclosure on different types of distributed applications. The use of a distributed storage application is exemplary and not limiting in anyways the scope of the invention.

In one embodiment, a storage protocol applied on the blockchain platform relies on the miners to serve as intermediaries in all storage transactions. Furthermore, the blockchain platform may enforce strict requirements on blobbers and blobbers' machines to ensure a fast and lightweight response time and execution.

In one embodiment, data integrity of the transaction is verified by using hash of a file's contents. In another embodiment, the data is fragmented in two or more parts and each data part is separately hashed to create a Merkle tree. In one embodiment, the entire Merkle tree is stored and probabilistically verified. In another embodiment, the miners store the Merkle root of the stored files.

The role-based distributed execution using a message flow model on a blockchain platform allows for a flexible and robust model with feedback and evaluation of different parties based on past interactions. For example, the blockchain platform involves interaction between two or more clients, who have data that they wish to store, and blobbers who are willing to store that data for a fee. Neither the client nor the blobber necessarily trust one another, so transactions are posted to a blockchain produced by a trusted network of miners, i.e., a trusted mining network.

Players. The blockchain platform using a message flow model for role-based distributed work seeks to minimize the load on the mining network, so miners are not directly involved in the file transfer between clients and blobbers. Nonetheless, the transactions posted to the blockchain assures clients that their data is stored and gives blobbers confidence that they will be paid for their service; if either party misbehaves, the blockchain platform has the information to help identify cheaters.

Each client includes an application responsible for encrypting the data. The blockchain platform relies on erasure coding, which is also performed by the client. Clients are assumed to have a public/private key pair and a certain amount of tokens. Erasure coding is a method of data protection in which data is broken into fragments, expanded and encoded with redundant data pieces and stored across a set of different locations or storage media. A miner works on a central chain of the blockchain platform. For example, in the context of storage, miners are responsible for accepting requests from clients, assigning storage to blobbers, locking client tokens to pay for their storage, and testing that blobbers are actually providing the storage that they claim. A blobber is responsible for providing long-term storage. Blobbers only accept requests that have been approved by the mining network, which helps to prevent certain attacks. Blobbers are paid in three ways: (i) When data is read from them, the clients give them special markers that the blobber can redeem for tokens; (ii) When client writes data to them, blobbers get special markers; and (iii) whenever a blobber is storing data, they are randomly challenged to provide special blocks and if these challenges are passed, the mining network rewards the blobber with tokens.

Protocol Sketch. For example, one basic message flow model based on roles on a blockchain platform for a distributed storage application can be broken into five parts. First, clients must use tokens to reserve system resources. These resources include the amount of storage, the number of reads, and the number of writes needed for the data. The client's tokens are locked for a set period of time. Once the time has elapsed, the client regains their tokens and loses their storage resources. Of course, a client may decide to re-lock their tokens to maintain their resources, though the amount of tokens needed may change depending on the economy.

When clients want to use the resources that they have purchased, they must write a transaction to the network declaring their intent. The mining network connects the clients with the appropriate blobbers and allows them to set up a secure connection.

Once the connection is established, the mining network no longer acts as an intermediary between the client and the blobbers. During this phase, the client generates markers to give to the blobber in exchange for access to system resources. The blobber collects these markers and redeems them with the mining network once the transaction is complete; this transaction also notifies the blobber that the transaction has finished, and lets the network know that the miner and blobber agree on the data that the blobber is expected to store. In one embodiment, the markers help resolve disputes in case the client and blobber do not agree on the Merkle root.

After the blobber has completed the transaction, the mining network will periodically challenge the blobber to provide a randomly chosen block of data. These challenges involve a carrot and stick approach; blobbers are punished if they fail the challenge, and blobbers are rewarded with additional tokens when they pass the challenge. The blockchain platform ensures that blobbers are paid even when the data is not frequently accessed. When the client no longer wishes to store a file, they issue a deletion transaction to the network. Once it is finalized, blobbers delete the file and clients may use their storage allocation to store other files.

Error and Repair. One or more error reporting protocols and/or repair protocols work with the basic message flow model based on roles on a blockchain platform for a distributed storage application. In one embodiment, the error reporting protocol allows both clients and blobbers to report problems to the network. These problems could include either reports of when other clients or blobbers are acting maliciously, or when a system fails or drops from the network unexpectedly.

In one embodiment, a repair protocol arises when a blobber is identified as malicious, drops from the network, or is no longer considered suitable for storing the data that it has. When needed, the client can read the data from the network, reconstruct the missing fragment of data, and re-upload it to the network. In one embodiment, the mining network reconstructs a missing slice of the data from any other available slices without involving the client.

Attacks. The message flow model for the blockchain platform is robust and resilient to different types of attacks. For example, an outsourcing attack arises when a blobber claims to store data without actually doing so. The attacker's goal in this case is to be paid for providing more storage than is actually available. For example, if Alice is a blobber paid to store file123, but she knows that Bob is also storing that file, she might simply forward any file requests she receives to Bob. The blockchain platform defense against this attack is to require all data requests to go through the mining network. Since the cheater must pay the other blobbers for the data, this attack is not profitable for the cheater. Additionally, the mining network's blockchain gives some accounting information that can be analyzed to identify potential cheaters.

A Sybil attack is a kind of security threat on an online system where one person tries to take over the network by creating multiple accounts, nodes or computers. This can be as simple as one person creating multiple social media accounts. But in the world of cryptocurrencies, a more relevant example is where somebody runs multiple nodes on a blockchain network.

Another attack may occur if two blobbers collude, both claiming to store a copy of the same file. For example, Alice and Bob might both be paid to store file123 and file456. However, Alice might offer to store file123 and provide it to Bob on request, as long as Bob provides her with file456. In this manner, they may free up storage to make additional tokens. In essence, collusion attacks are outsourcing attacks that happen using back-channels. A Sybil attack in the context of storage is a form of collusion attack where Alice pretends to be both herself and Bob. The concerns are similar, but the friction in coordinating multiple partners goes away. The blockchain platform message flow based model requires that the blobbers are assigned randomly for each transaction, helping to further reduce the chance of collusion.

The blockchain platform uses erasure codes to help defend against unreliable blobbers in a network. Furthermore, the blockchain platform makes demands on the capabilities of blobbers authorized to use the platform. For example, if it repeatedly underperforms expectations, a blobber's reputation may suffer, and risk being dropped from the network.

In another attack, a client might attempt to double-spend their tokens to acquire additional resources. However, the client is not given access to its resources until the transaction has been finalized. The blockchain platform transactions are designed for rapid finalization, so the delay for the client should be minimal. Other attacks such as fraudulent transactions are the purview of the mining protocol and the blockchain platform is well designed with defenses based on its robust implementations of authentication and data integrity modules. A replay attack also fails on the blockchain platform with the use of timestamps as one of the fields to assign unique transaction id.

Finally, generation attacks may arise if a blobber poses as a client to store data that they know will never be requested. By doing so, they hoped to be paid for storing this data without actually needing the resources to do so. The blockchain platform can defend against generation attacks with a challenge protocol that requires blobbers to periodically provide files that they store.

Locking System Resources. The message flow model for the blockchain platform is robust and resilient in locking system resources and reusing the same when resources are freed. For example, in order to store files, clients must use their tokens to purchase a certain amount of storage for a year. During this period, the clients' tokens are locked and cannot be sold. Likewise, to access or update their data, clients must purchase a certain number of reads and writes. To lock tokens, the client posts a transaction to the mining network. For example, the transaction includes the following without limitations: (i) the id of the client (client_id); (ii) the amount of storage (amt_storage); (iii) the number of reads (num_reads); (iv) the number of writes (num_writes); (v) a params field for any additional requirements allowing for flexibility. Only one of amt_storage, num_reads, and num_writes is required, since a client may be locking additional resources to supplement a previous transaction. However, the blockchain platform generally expects a client to lock all three in any transaction.

A person of ordinary skill in the art would understand that there are well-established methods and techniques to establish a secure digital connection between any two parties on the internet. The blockchain platform relies on the well-established methods to establish a secure connection with an added layer of security based on the role of the party i.e. the role of a client, a blobber or a miner. Neither the client nor the blobber trust one another, yet the blockchain platform allows both parties acting in its own best interest to nonetheless benefit each other. Any transgressions can be identified by the mining network of the blockchain platform with one or miners having the authority to punish any misbehaving party.

Creating a Connection. In establishing a connection, the blockchain platform performs the following: (i) assign blobbers to handle a client's request; and (ii) to ensure that the mining network knows what data the client wishes to store, allowing the network to police the client's and blobber's behavior. In one embodiment, the client and the blobber establish a session key between themselves. In another embodiment, the client and blobber set up a Transport Layer Security (TLS) connection instead of a session key.

A possible attack when creating a connection may include that a client might create a transaction on the mining network, but never send the data to the blobber, either as an attempt to damage a blobber's reputation or to prevent a blobber from being paid by other clients. On the blockchain platform, three factors mitigate this attack: (1) The client had to lock up tokens to perform this attack. In essence, they would be paying for storage without using it. (2) Blobbers are not challenged by the mining network until they post a transaction to finalize the data exchange. (3) Blobbers periodically monitor the blockchain for transactions involving them; if they notice this transaction, they can cancel it using a error reporting protocol.

Similarly, a blobber might not respond to the client and refuse to complete the connection. Again, several factors make this attack unlikely: (1) Once the connection is established, the client is expected to send markers. The blobber redeems these markers for tokens, and hence has a vested interest in completing the connection. (2) If the transaction times out, the client can report an error. (3) If the client becomes dissatisfied, they can delete their data from the blobber and reassign it to a different blobber. When this happens, the blobber is no longer paid for storing the data.

Reads and Writes. After establishing a secure connection as described above, the blockchain platform performs reads and writes as described herein. Once a secure connection has been established between the client and the blobber, the client can choose to either read data from the blobber or update data stored with the blobber. The blockchain platform for uploading or downloading files requires that the client compensate the blobber. This process is done through the use of special read_marker and write_marker values created by the client. Each marker is a pair of a number (i) and a signature, where "i" is a counter starting at 0 that is incremented with each marker sent. READ and WRITE are constants included in the signatures denoting whether this is a read_marker or write_marker respectively.

The format of a read_marker is [READ, trans_id, blobber_id, block_num, i]client. The format of a write_marker is [WRITE, trans_id, blobber_id, hash(data), block_num, i]client, where hash(data) is the hash of the current block of data being sent. The blobber collects these markers, and when the transaction has either completed or timed out, the blobber writes a transaction to the blockchain effectively cashing in the markers in exchange for tokens. This transaction has the following effects: (i) The blobber is paid in tokens. (ii) The client loses the corresponding number of reads and writes. (iii) The Merkle root of the data (if it has been updated) is confirmed by the blobber. At this point, the blobber may be challenged to provide the data that they store. Since the blobber is also compensated for passing these challenges, they have a vested interest in completing the operation. Note that future transactions only allow access to the data if there is no discrepancy between the client and the blobber on the Merkle root of the data.

The information stored in the params field in message 1 depends upon the nature of the transaction. If this is a new file storage request, the k and n values for erasure coding must be included, since these settings affect the behavior of the network during challenges. Also, if this is a new file upload or a file update, the client must include the file size, the version number of the file, the fragment_id, chosen by the client, for this fragment of the erasure coded data.

Markers may serve as an additional authorization tokens, and hence the double-spending problem is a concern. Blobbers might attempt to redeem a marker multiple times, or a client might attempt to pay different blobbers with the same marker. Each trans_id uniquely identifies the file involved, and the mining network does not accept markers if the trans_id does not match an existing transaction for an open connection. When the blobber redeems the markers, the connection is considered closed, and so the blobber cannot reuse the markers in a future transaction. Each marker must be unique within the redemption transaction, so the blobber is not able to double spend the marker within the transaction either. A client might attempt to pay multiple blobbers with the same marker. However, since both trans_id and blobber_id are included in the marker, this attack would fail.

If blobbers pose as clients, it is possible that they could generate markers without reading the data solely as a mechanism to get tokens. However, since the blobber would have to lock tokens to acquire reads, it would in some sense be paying itself with its own tokens.

Clients might create more markers than the number of reads and writes they have purchased, essentially writing checks that they cannot cash. Clients are expected to track the number of markers that they have used, and therefore are the best ones to hold accountable. On the blockchain platform, if a client exceeds the number of markers that they are authorized to create, the blobber is still paid. However, instead of paying the blobbers in newly-minted tokens, they are paid in tokens taken from the client. Other type of attacks might include a blobber ignoring a client's request for data and simply cash the marker's sent by the client. However, in this case the client would quickly stop sending markers to the blobber, preventing the blobber from receiving additional payment. Furthermore, the client would report an error to the network, and might decide to delete their data from the blobber. The blobber might send invalid data; however, the client might have the Merkle tree, in which case they would quickly spot the problem and report an error. Regardless, the blobber is expected to store the Merkle tree and can asked to provide it. The mining network stores the Merkle root, preventing the blobber from providing a false tree.

In scenarios where a client simply writes data, the blobber might not store the data. However, when redeeming markers, the blobber must confirm the new Merkle root. Therefore, the mining network would be able to catch the blobber's cheating with the challenge protocol. In another scenario, a client might send different data to the blobber that does not match the Merkle root specified in the blockchain, either in a hope to damage the blobber's reputation or to frustrate the blobber by using its resources without paying it. The blobber cannot finalize the transaction, and therefore will not be challenged (and paid) for storing the data. However, the blobber can report the error to the mining network. Furthermore, every write_marker includes a hash of the block of data sent, which can serve as a form of proof about what data the blobber received from the client.

Deleting Files. To delete a file, the client posts a transaction to the blockchain deleting the resource. Once the transaction is finalized on the blockchain, the client regains the storage allocation.

Blobbers are expected to poll the blockchain for these transactions. Once they notice that a file has been deleted, all blobbers storing slices of this data delete its data. In some attacks, a client might attempt to get free storage by a distributed denial of service attack (DDoS) the blobbers before they receive the message to delete the data, but the mining network would not approve future read requests. Clients might attempt to delete data, but maintain an open connection with blobbers. With this approach, the client would attempt to get free storage without needing to go through the mining network. A defense against this attack is that the mining network rejects all requests to delete data when there are open connections. If a blobber fails to close a connection, the client can report the error to the mining network and close the connection that way. Nothing on the blockchain platform enforces that the blobbers actually delete the data when asked though a blobber has little economic incentive to keep it. If the client is concerned about the confidentiality of its data, the client can encrypt its data before storage.

Challenge Request. In order to verify that a blobber is actually storing the data that they claim, the protocol relies on the miners periodically issuing challenge requests to the blobbers. The blockchain platform message flow model is also how blobbers are rewarded for storing files, even if the files are not accessed by any clients. When the blobber passes the challenge, it receives newly minted tokens. The mining network is responsible for establishing consensus on whether the blobber has passed the challenge. A transaction is posted by the mining network specifying which block of data is requested. The blobber sends the data to the mining network as well as the nodes of the Merkle tree needed to calculate the Merkle root. If the mining network reaches consensus that the blobber failed to provide the correct data in the allocated time, a transaction is posted punishing the blobber. Otherwise, a transaction is posted rewarding the blobber with the token. In one embodiment, an update to existing data may be canceled. The blobber might not have the correct data, and so cannot satisfy future challenges. Therefore, these cases are treated as delete transactions.

Recovering Data. There could be scenarios when the blockchain platform needs to recover data. When a blobber disappears unexpectedly from the network, or when a canceled transaction causes data to be lost, the data needs to be regenerated and stored with another blobber. In one embodiment, the repair operation is performed by the client, who will be required to get the needed slices, regenerate the new slice, and post a new transaction to store the regenerated slice. The cost of the transactions to recover the client's data is paid for by the client. However, if the loss is due to the misbehavior of a blobber, the blobber's stake may be seized and given to the client to help pay for the recovery.

If a client attempts to update data simultaneously with all blobbers, it is possible that all copies of the data could be deleted. In order to avoid this issue, the client can adjust the k and n values used in the erasure codes to provide greater resiliency and update the slices of data in sequence.

In one embodiment, the client must initially commit to the Merkle root of the data whenever a file is changed on the network. The result is that the transactions are either data writes or data reads. In one embodiment, the blockchain platform allows for reads and writes within a given client/blobber exchange. The client indicates the Merkle root is not yet known; when the blobber writes a transaction to cash their markers, they also commit to a Merkle root. The client can write a transaction on the blockchain either approving or contesting the Merkle root.

In one embodiment, the client can rebuild any data lost when a blobber goes offline unexpectedly. The client might not always be the best choice for this responsibility. If the client does not connect regularly, there might be a delay before they notice.

In one embodiment, when a blobber fails a challenge to provide a block of data, the mining network can initiate transactions to recover the missing fragment of data and reassign it to a different blobber. Any encryption by the client is performed before erasure coding to ensure that the data can be reconstructed without the client's aid.

Distributed Content Delivery Network. The blockchain platform using the message flow model can be used to geographically distribute data to increase the performance and availability of a client's data. A client may use encryption, distribute an application to reconstruct the data or use null encryption. The blockchain platform supports the ability for a client to stream content from a blobber.

On the blockchain platform, data blobs are identified by a combination of the client's unique id (client_id) and the client-chosen data_id. Individual transactions are assigned a trans_id based on the triple of these two fields and a timestamp (T). In addition to creating unique ids for transactions, the timestamp also ensures that each request is fresh and helps defend against replay attacks.

A "chunk" is a portion of data stored by one blobber. The existing storage provided by the blobber is represented by a series of chunks C (C1, C2, . . . , Cn) forming an allocation. An allocation may be, for example, a unit of storage, disk space, volume, bucket and the like allocated by a fixed number of storage providers. The choice of the allocation may be based on for example, read/write price, challenge completion time, preferred blobbers, or random. Each allocation with a blobber has a Merkle root that is tracked on the blockchain for any CRUD operation. A subset of chunks may be used to reconstruct the data. Reconstruction may also be performed using other allocations based on erasure code support written by other blobbers when separate allocations are tailored to allow for data reconstruction from other blobbers.

In an embodiment, a client may decide to change a blobber without a provable fault attributed to the blobber, for example, the client would like to try a different one as an experiment. In some embodiments, the client may simply want to prevent usage of the blobber for some period of time. Alternatively, the client may decide to change a blobber that has repeatedly failed challenges and not only prevent usage of the blobber, but also reassign existing storage provided by the blobber. In the context of preventing usage of the blobber, the blobber is referenced as the "old blobber." In an embodiment, the client updates the allocation to add a new blobber by writing a transaction identifying the new blobber to use for the allocation to the blockchain. In this case, the new blobber accepts writes, though the blobber might have to queue them up. The blobber does not provide reads for the existing series of chunks C (C1, C2, . . . , Cn), but will for the new writes. The client may already have access to the content found in the existing series of chunks C (C1, C2, . . . , Cn), for example, it may be cashed locally. If not available locally the client may read the data from the old blobber. In some cases, the client may be able to read missing data from other blobbers and based on erasure coding redundancy reconstruction the existing series of chunks C (C1, C2, . . . , Cn). Once the data is available to the client, the client writes the chunks C (C1, C2, . . . , Cn) to the new blobber. The client pays for the writing of the chunks the chunks C (C1, C2, . . . , Cn) to the new blobber. This requires sufficient tokens in the write pool. The tokens may be available due to previously recovered tokens from failed challenges. After writing the chunks C (C1, C2, . . . , Cn) by the new blobber and passing any challenges, the new blobber cashes write marker(s), effectively declaring itself online. The root hash of new blobber should be in sync with the old blobber and the new blobber is now available for reads and challenges. The client may allow the old blobber to bid for new transaction or update the allocation to drop the old blobber. This may be accomplished by writing a transaction to drop the old blobber to the blockchain or to the allocation. Once the transaction is processed, the old blobber will no longer be selected for reads or writes. The old blobber can still redeem outstanding read markers, but would be prevented from redeeming outstanding write markers and would be expected to stop storing data.

In one embodiment, FIG. 1 depicts a diagram 100 illustrating an example of a blockchain platform based on a message flow model for implementing different distributed applications. In the example of FIG. 1, the environment includes client 1 110, client 2 112, . . . , client n 114. The environment includes miner 1 120, miner 2, 122, . . . , miner n 124. The system includes blobber 1 130, blobber 2 132, . . . , blobber n 134. Each client system [110, 112, . . . , 114] may include components to store, update, get, read, write and/or delete requests. Although many clients, miners, and blobbers are supported, references to client 110, client system 110 or client device 110 will be used to indicate any selected client system. References to miner 120 or miner system 120 will be used to indicate a selected plurality of miners. References to blobber 130 or blobber system 130 will be used to indicate a selected plurality of blobbers. In an embodiment, any client system may include storage requests. A client can implement many types of flexible and distributed applications on the client system 110 using the client aspect of the blockchain platform using a message flow model. In the embodiment, the miner 120 includes components to process requests from the clients including storage requests. Two or more miners form a mining network. In the embodiment, the blobber 130 includes components to fulfill storage requests that are initiated by the client 110 and approved by miner 120.

Network 140 can be different wireless and wired networks available to connect different computer devices including client and server systems. In an implementation, network 140 is publicly accessible on the internet. In an implementation, network 140 is inside a secure corporate wide area network. In an implementation, network 140 allows connectivity of different systems and devices using a computer-readable medium. In an implementation, the blockchain platform using a message flow model allows users on the client system, the blobber or the miner to set privacy settings that allow data to be shared among select family and friends, but the same data is not accessible to the public. In an implementation, the blockchain platform using a message flow model allows users on the client system, the blobber or the miner to encrypt data to be shared among select family and friends, but the same data while available cannot be decoded by the public.

The messaging and notification between different components can be implemented using Application Programming Interface (API) calls, extensible markup language ("XML") interfaces between different interfaces, Java/C++ object oriented programming or simple web-based tools. Different components may also implement authentication and encryption to keep the data and the requests secure.

Figure 2:
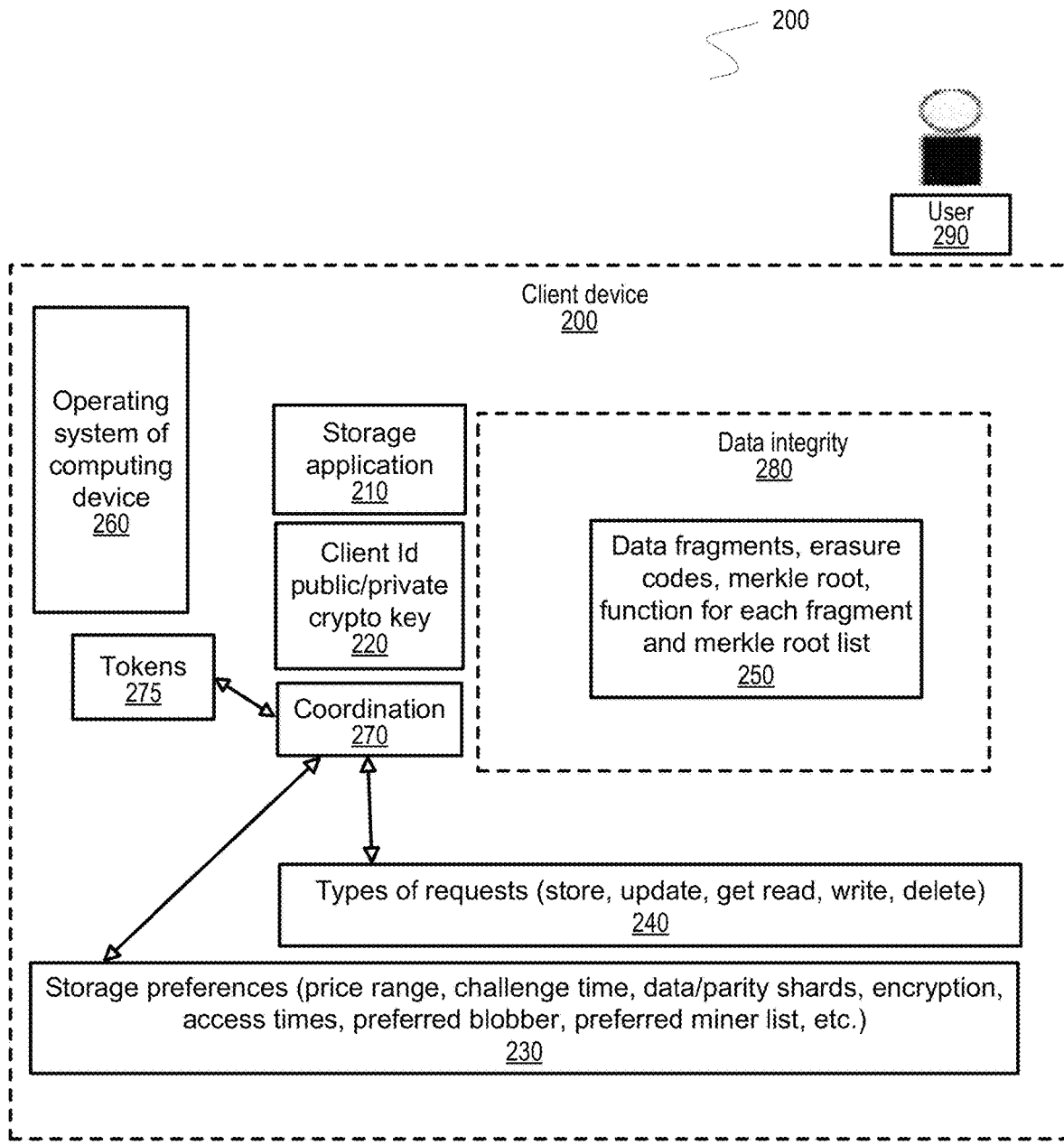
FIG. 2 depicts an embodiment of a client device.

FIG. 2 depicts a client device 200 which is an exploded view of a client system 110 shown in FIG. 1. For a distributed storage application implementation, the client has a storage application 210 that interacts with the operating system 260 of the client device 200. In an example embodiment, the client computing device may have family photos, videos or business-related files for storage. The client device 200 may use the Diffie-Hellman key exchange method with another client, for example client 2 112. The Diffie-Hellman key exchange method allows two parties that have no prior knowledge of each other to jointly establish a shared secret key over an insecure channel, such as, network 140. This key can then be used to encrypt subsequent communications using a symmetric key cipher. The client uses a client_id 220 with a Diffie Hellman public and private cryptography keys to establish session keys. In one embodiment, the client and the blockchain platform uses Transport Layer Security, i.e. symmetric keys are generated for each transaction based on a shared secret negotiated at the beginning of a session. The client 200 gets preauthorized tokens 275 for storage allocation on the blockchain platform. The storage preferences for the client are coordinated using 270. A client's storage preferences 230 include price range, challenge time, data/parity shards, encryption, access times, preferred blobber, preferred miner lists, etc. Types of requests 240 include store, update, get, read, write and/or delete requests. The data integrity 280 includes techniques to create a hash based on available data, encryption of the data, division of data into fragments, use of erasure codes, Merkle root and Merkle tree creation based on data fragments and a Merkle root list for different types of data. A client may use one or more options in different types of combinations to preserve data integrity 280 verification when sending data out on the system to different blobbers on the blockchain platform. In one implementation, the client has an option to create its own data_id for selected data. In one implementation, the client gets an automatically generated data_id based on different client preferences and parameters of usages. A user 290 is shown using the client device 200. In one implementation, the client system includes module to report errors when a blobber does not send an anticipated message. In one implementation, the client system monitors the blockchain for different suspicious activities related to its own work.

Figure 3:
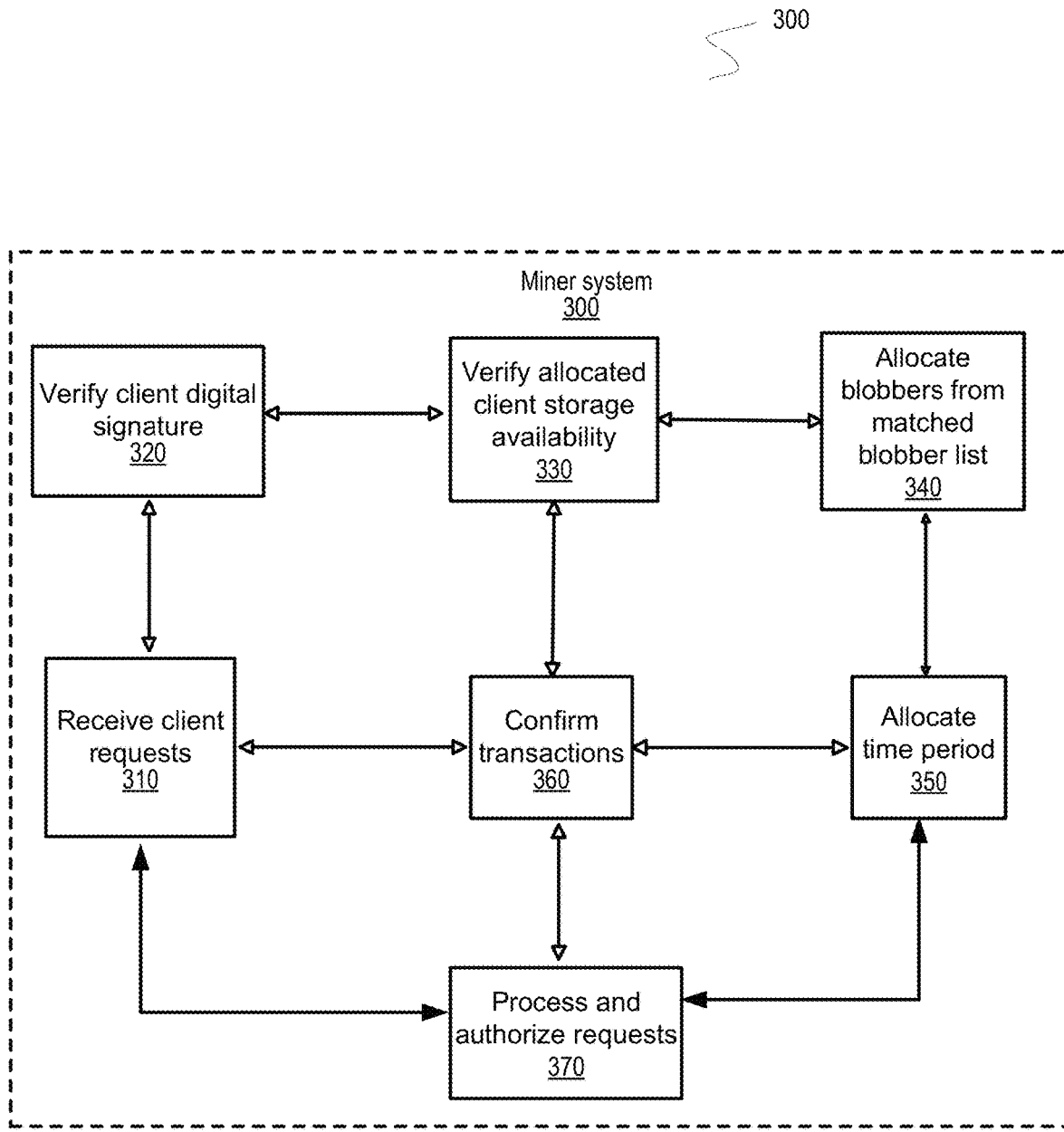
FIG. 3 depicts an embodiment of a miner system.

FIG. 3 depicts a miner system 300 which is an exploded view of a miner system 120 of FIG. 1. The different components or modules included in a miner system includes a module to process and authorize requests 370, receive client requests 310, verify client digital signature 320, verify whether client is allowed to make a particular request based on allocated storage for a client and availability on the system 330, allocate blobbers from a matched blobber list 340, allocate time period to complete the transaction 350, and confirm transaction 360 on the blockchain platform. In one embodiment, the miner system includes module to monitor the blockchain for different suspicious activities. In one embodiment, the miner system includes mechanism to handle error reports received from either a client or a blobber. In one embodiment, the miner system includes ranking or evaluations for clients and/or blobbers associated with the blockchain platform.

Figure 4:
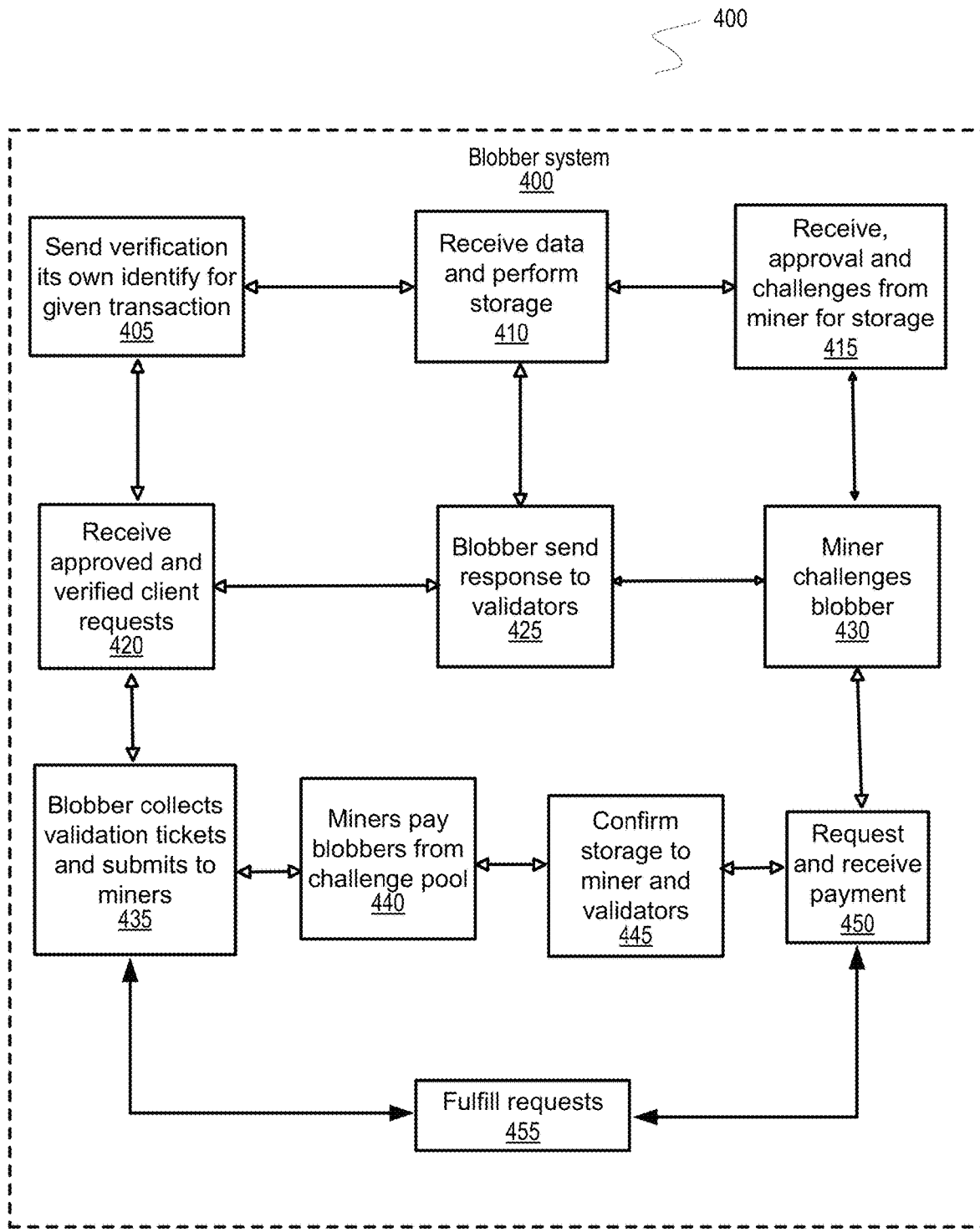
FIG. 4 depicts an embodiment of a blobber system.

FIG. 4 depicts a blobber system 400 which is an exploded view of a blobber system 130 of FIG. 1. The different components or modules included in a miner system includes a module to fulfill requests 455, receive approved and verified client requests 420, send verification of its own identity for a given transaction 405, receive data and perform storage 410, receive approval and c h all e n g e s from miner for storage 415, confirm storage to miner and validators 445, request and receive payment 450 for storage and handling of the requests. In an embodiment, after a blobber has received approved and verified client requests 430, the blobber performs the required storage requests, that is, fulfills requests 455. The blobber collects validation tickets and submits the validation tickets to miners 435. The miner, acting as a validator, may challenge the blobber 430 at random. The blobber responds to the challenge by sending a response to the validators 425. The miners pay blobbers from the challenge pool 440 after confirming storage to miner and validators 445 which supports a miner request for payment after which the miner receives payment 450. In one embodiment, the blobber system includes a module to report errors when a client does not send an anticipated message. In one embodiment, the blobber system monitors the blockchain for different suspicious activities related to its own work.

Figure 5:
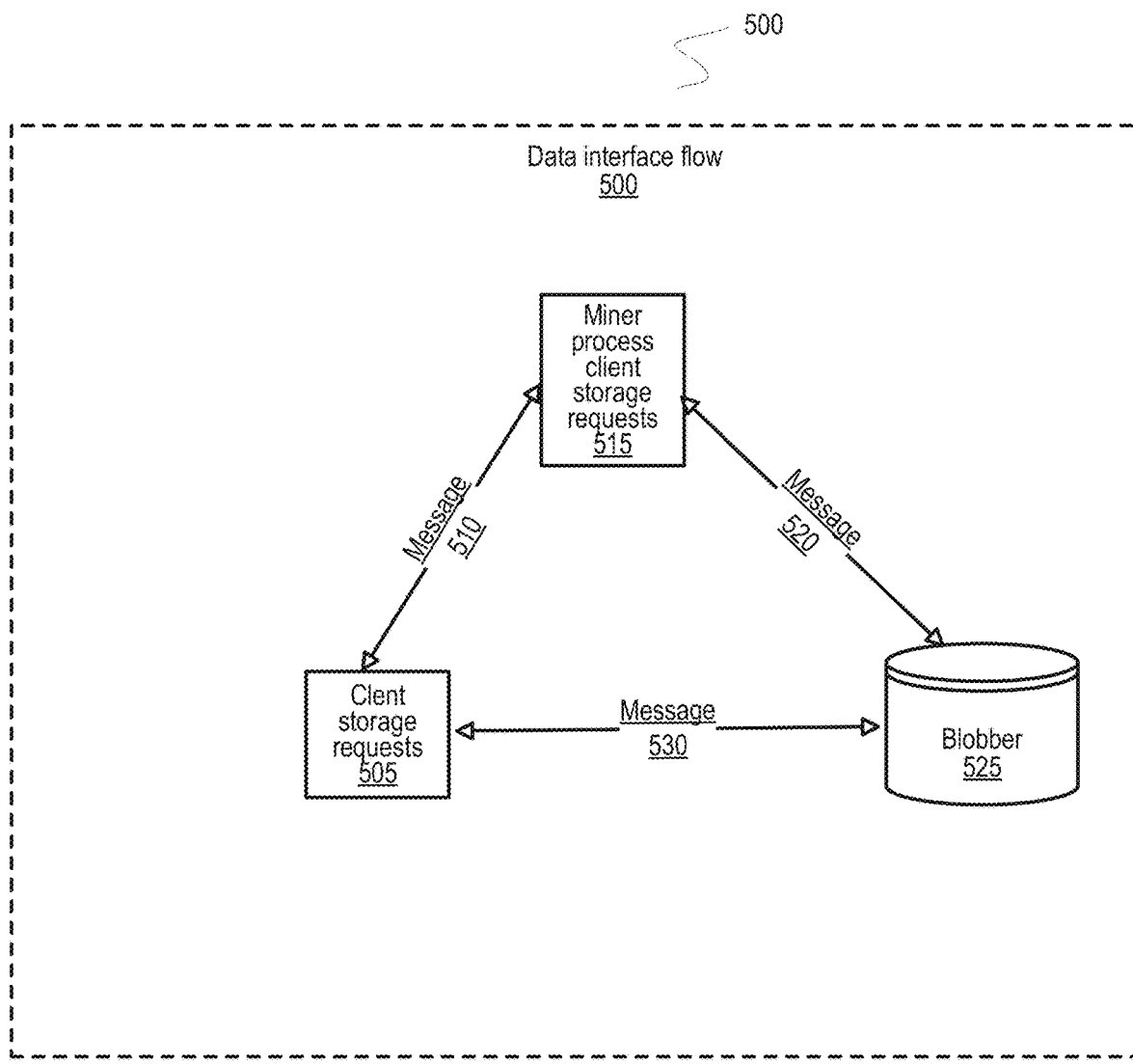
FIG. 5 depicts a data interface flow between client storage requests and a bidirectional message flow between different role based entities on the blockchain system.

FIG. 5 shows the data interface flow 500 between client storage requests and a bidirectional message flow between different role based entities on the blockchain. The message 510 is a request and acknowledge between a client 110 making client storage requests 505 and a miner 120 with the miner processing storage requests 505. The message 520 may be a verification of a storage request 510 or may be an acknowledgement of allocating blobber 525 like blobber 130 to handle the client store requests 515. The message 530 is the bidirectional message between client and blobber to fulfill the request.

Figure 6:
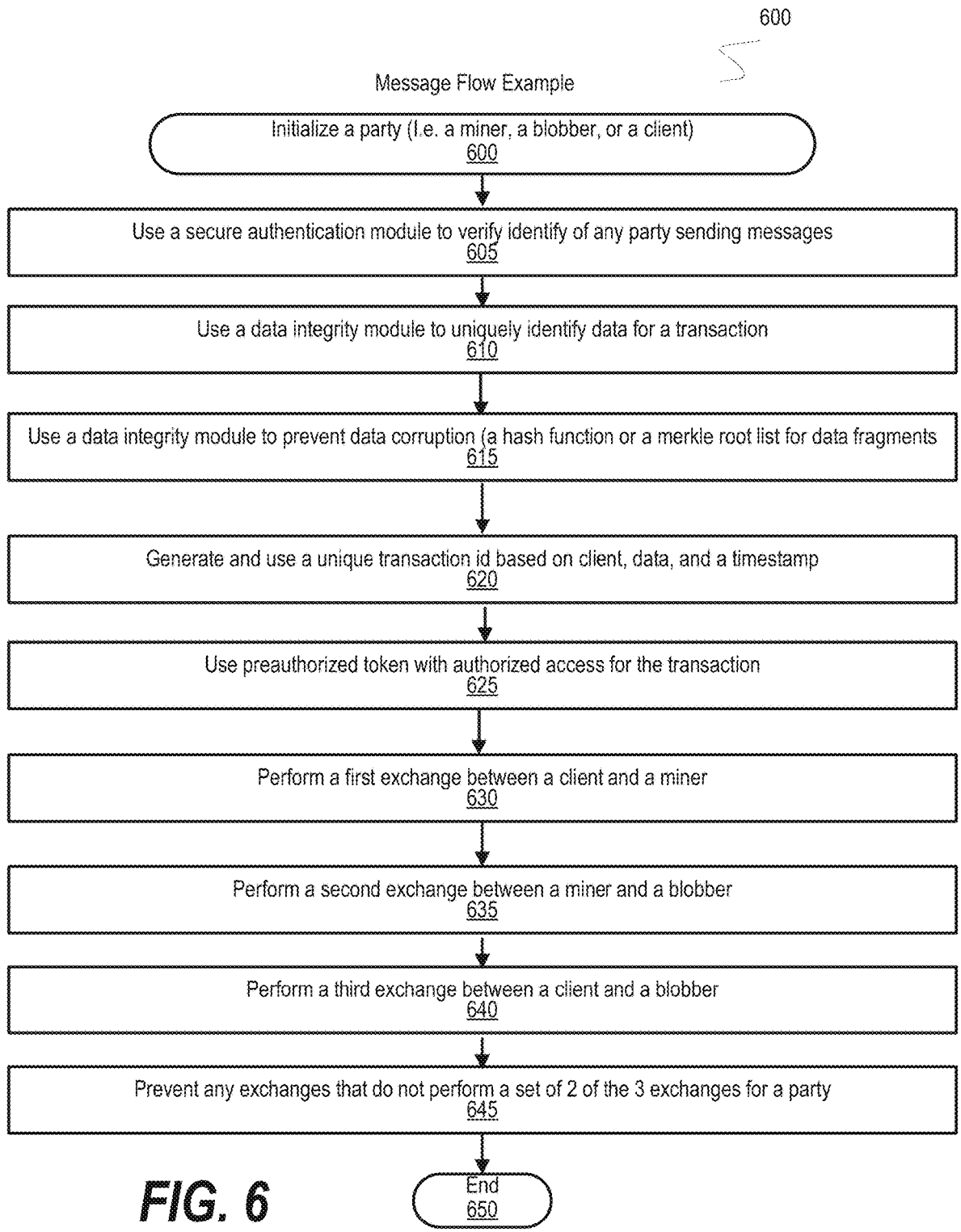
FIG. 6 depicts a flowchart illustrating an example of using a message flow model.

FIG. 6 depicts a flowchart 600 illustrating an example of a method for a blockchain platform using a message flow model based on role-based entities. The flowchart 600 is discussed in conjunction with the blockchain platform environment shown in the diagram 100 in FIG. 1. At block 600, a client, miner and/or a blobber system is initialized to use the blockchain platform using message flow model based on role-based entities. At block 605, use a secure authentication module to verify identity of any party sending messages. In one embodiment, this is achieved by assigning a client id or blobber id used in combination with Diffie-Hellman public and private keys. In one embodiment, the client and blobber use a secure connection using Transport Layer Security. In one embodiment the miners are also assigned miner ids and secure cryptographic certificates to ensure that the miner is trusted. At block 610, use data integrity module to uniquely identify data for a transaction. At block 615, use data integrity module to prevent data corruption, for example, a hash function or a Merkle root list for data fragments. At block 620, generate and use a unique transaction id based on the triple of client_id, data_id and a timestamp. At block 625, use preauthorized token with authorized access for the transaction. At block 630, perform a first exchange between a client and a miner. At block 635, perform a second exchange between a miner and a blobber. At block 640, perform a third exchange between a client and a blobber. At block 645, prevent any exchanges that do not perform a set of two of the three exchanges for an entity. At block 650 the flow ends.

Figure 7:
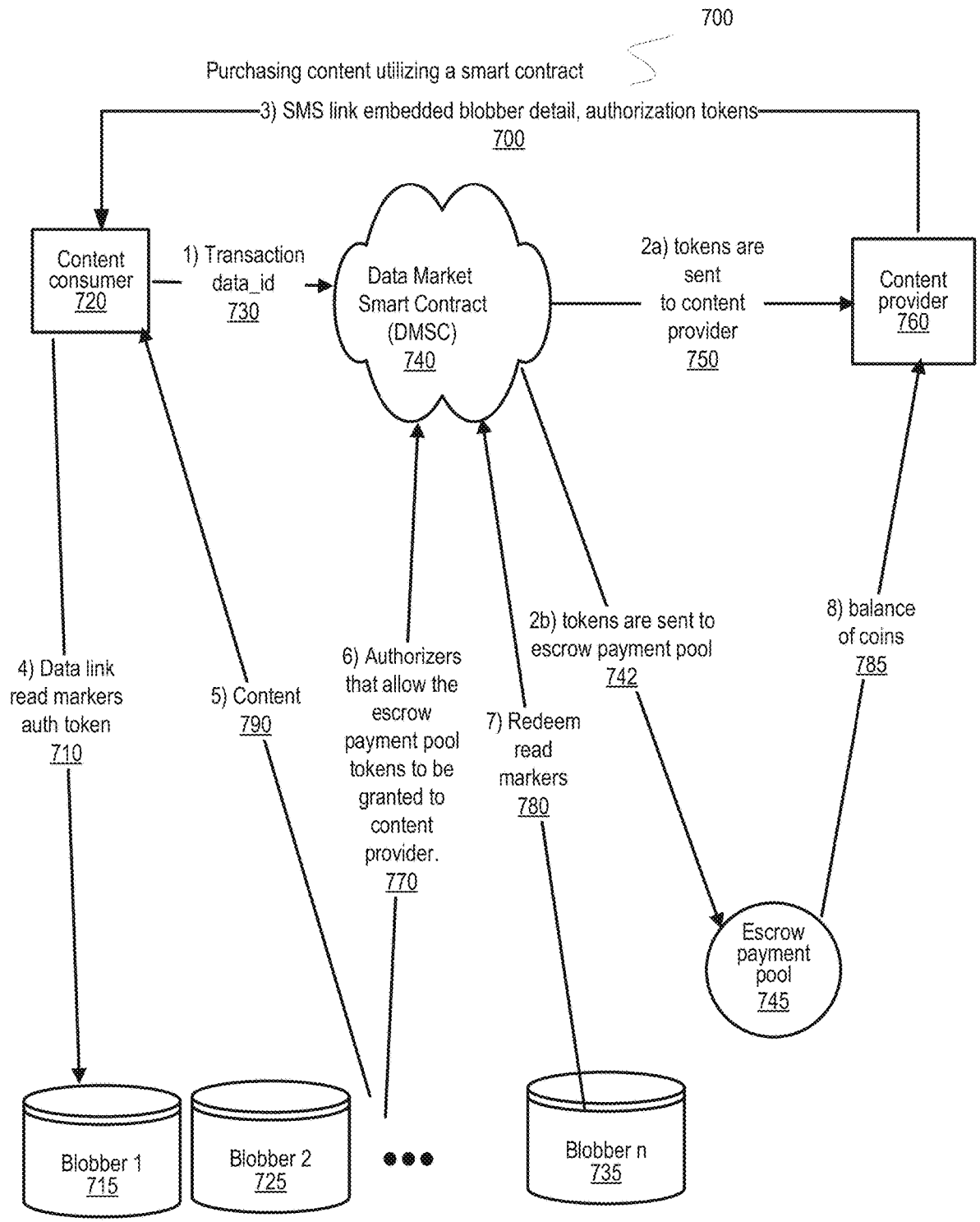
FIG. 7 depicts a schematic flow of an embodiment for purchasing a content utilizing smart contract.

FIG. 7 depicts a schematic flow of an embodiment for purchasing a content utilizing smart contracts. The content consumer 720 invokes a data market smart contract (DMSC) 740 utilizing a transaction data_id 730. The data_id 730 is some representation that identifies what content the content consumer is wishing to purchase. The content provider may have described the content and provided a link to the content or some data_id that includes information such as the content provider 760. The smart contract causes at least two actions to occur: 2a) tokens are sent to content provider 750 and 2b) tokens are sent to escrow payment pool 742. The content provider 750 receives the tokens at block 760. The escrow payment pool 745 receives the tokens at step 745. The content consumer 720 may use a short message service (SMS) link to transfer information including embedded blobber details and authorization tokens 700 to content provider 760. The content consumer 720 then sends data link read markers and authorization token 710 to a selected set of blobbers, blobber 1 715, blobber 2 725, . . . , blobber n 735. As the blobbers retrieve the content 790 is received by the content consumer 720. When the content 790 is fully read by the content consumer 720 and verified by authorizers that allow the escrowed funds from the escrow payment pool 745 to be granted to the content provider 770 via communication to redeem read markers 780 from the blobbers according to the data market smart contract (DMSC) 740. Then the read markers may be redeemed by the content provider 760 by utilizing the balance of coins 785 available in the escrow payment pool 745.

Figure 8:
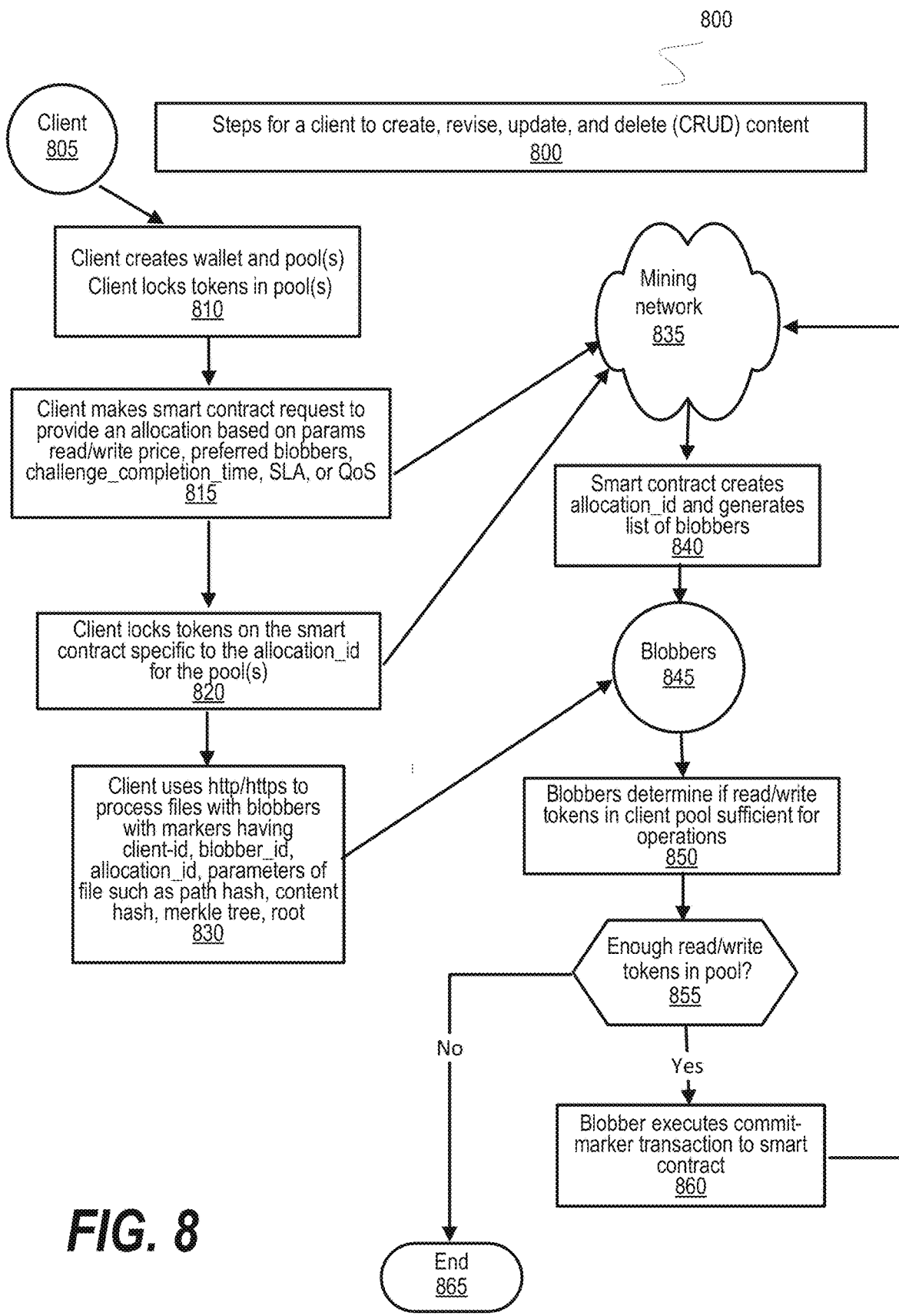
FIG. 8 depicts a process depicting the steps for a client to create, revise, update, and delete (CRUD) content.

FIG. 8 shows the steps taken by a process for a client to create, revise, update, and delete (CRUD) content 800. At step 810, the client 805 creates wallet and pool(s). The client locks tokens in pool(s). At step 815, the client makes smart contract request to provide an allocation based on params, such as, read/write price, preferred blobbers, challenge_ completion_time, service-level agreement (SLA), or quality of service (QoS). At step 820, the client locks tokens on the smart contract specific to the allocation_id for the pool(s). At step 830, the client uses http/https to process files with blobbers 845 based on markers having client-id, blobber_id, allocation_id and parameters for the file such as path hash, content hash, merkle tree, root. At step 840, the smarts contract creates allocation_id and generates a list of blobbers based on input from the mining network 835, At step 850, blobbers 845 determine if read/write tokens in client pool sufficient for operations. The Blobbers determine as to whether enough read/write tokens in pool (decision 855). If enough read/write tokens in pool, then decision 855 branches to the 'yes' branch. On the other hand, if not enough read/write tokens in pool, then decision 855 branches to the 'no' branch. At step 860, the blobbers execute commit-marker transaction to smart contract and proceeds to return control to the mining network 835. FIG. 8 processing thereafter ends at 865.

Figure 9:
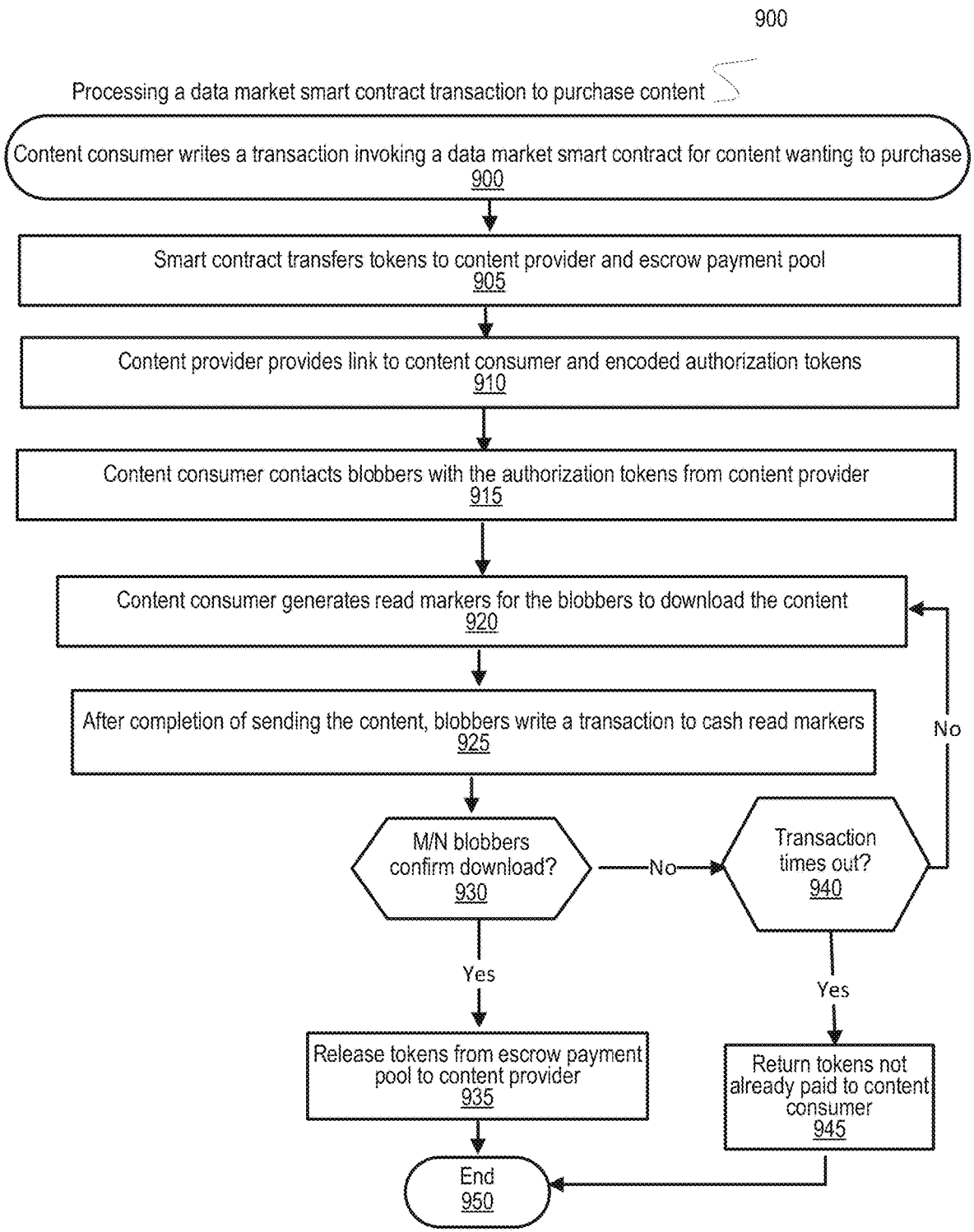
FIG. 9 shows the steps taken for processing a data market smart contract transaction to purchase content.

FIG. 9 shows the steps taken to process a transaction invoking data market smart contract for content requested to be purchase FIG. 9 processing commences at 900 where the content consumer writes a transaction invoking a data market smart contract for content wanting to purchase. At step 905, the smarts contract transfers tokens to content provider and escrow payment pool.

At step 910, the content provider provides link to content consumer and encoded authorization tokens. At step 915, the content consumer contacts blobbers with the authorization tokens from content provider. At step 920, the content consumer generates read markers for the blobbers to download the content. At step 925, after completion of reading the content, blobbers write a transaction to cash read markers. A determination is made as to whether M/N blobbers confirm download (decision 930). If not M/N blobbers confirm download, then decision 930 branches to the 'N' branch. If M/N blobbers confirm download, then decision 930 branches to the 'Y' branch. At step 935, tokens are released from the escrow payment pool to content provider. A determination is made as to whether transaction times out (decision 940). If not transaction times out, then decision 940 branches to the 'no' branch which loops back to 920. This looping continues until the transaction times out, at which point decision 940 branches to the 'yes' branch exiting the loop. At step 945, tokens not already paid are returned to the content consumer. FIG. 9 processing thereafter ends at 950.

Figure 10:
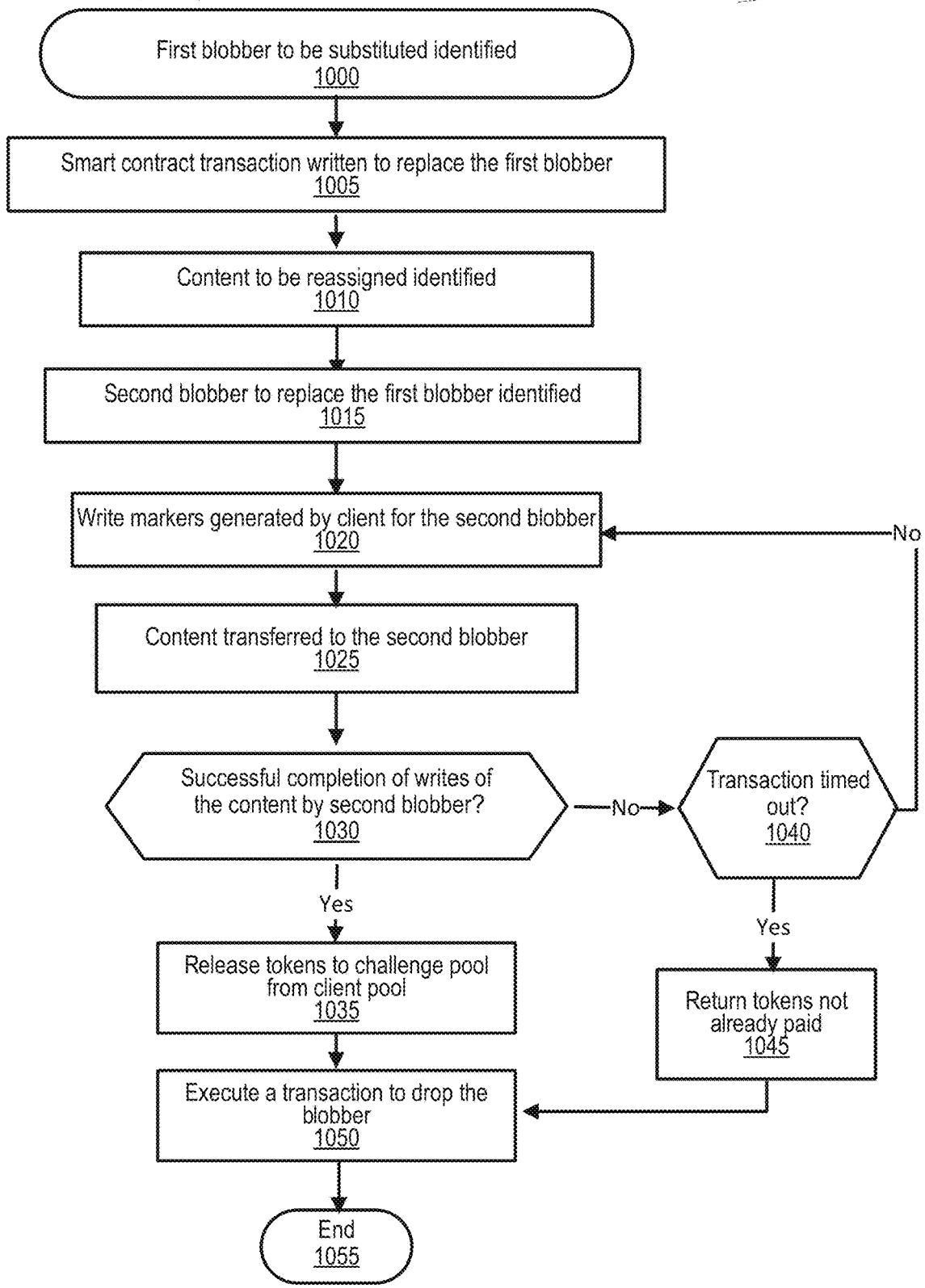
FIG. 10 depicts a flow for replacing a first blobber with a second blobber.

FIG. 10 depicts a process for replacing a first blobber with a second blobber Processing commences at 1000 where the first blobber to be replaced is identified by the process. At step 1005, the smart contract transaction is written to replace the first blobber by the process. In some embodiments, only the new blobber to use may be identified in the transaction. At step 1010, the content to be reassigned is identified by the process. The content may be tracked as an allocation identified as chunks C (C1, C2, ..., Cn). At step 1015, the second blobber to replace the first blobber identified by the process. At step 1020, writes markers are generated by client for the second blobber by the process. At step 1025, the contents are transferred to the second blobber by the process. The process determines as to whether successful completion of writes of the content by second blobber (decision 1030). If successful completion of writes of the content by second blobber, then decision 1030 branches to the 'yes' branch. On the other hand, if not successful completion of writes of the content by second blobber, then decision 1030 branches to the 'no' branch. The process determines as to whether transaction timed out (decision 1040). If not transaction timed out, then decision 1040 branches to the 'no' branch which loops back to 1020. This looping continues until transaction times out, at which point decision 1040 branches to the 'yes' branch exiting the loop. At step 1035, the process releases tokens to challenge pool from client pool. At step 1045, the process returns tokens not already paid. At step 1050, the process executes a transaction to drop the blobber. FIG. 10 processing thereafter ends at 1055.

Figure 11:
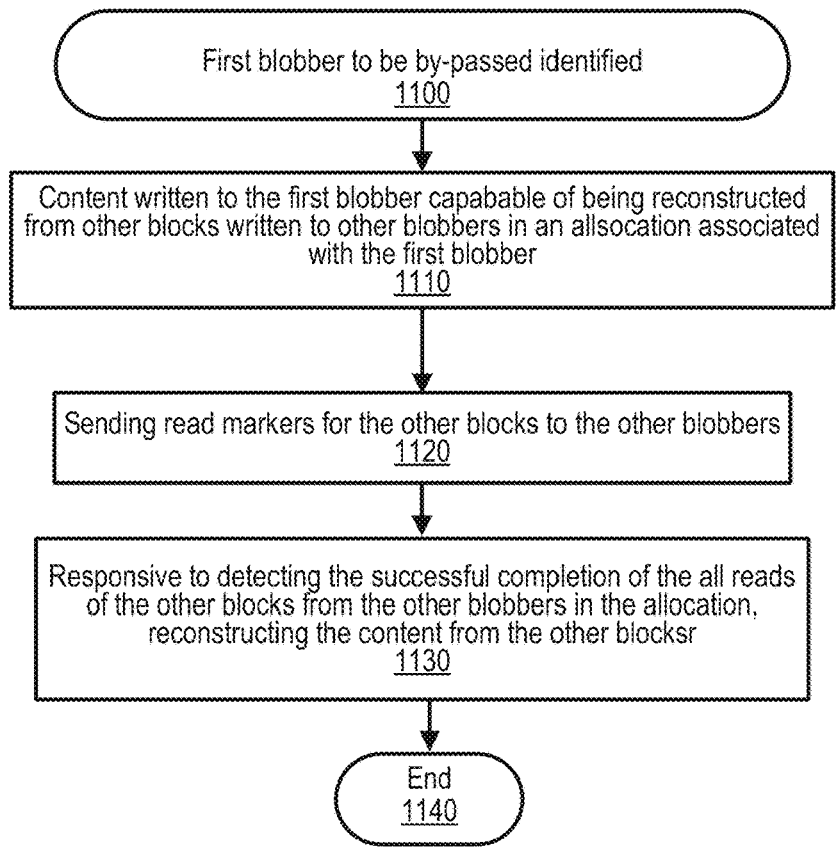
FIG. 11 depicts a process for bypassing usage of a blobber.

FIG. 11 depicts a process for bypassing usage of a first blobber. Processing commences at 1100 where the first blobber to be by-passed is identified. At step 1110, the process identifies contents written to the first blobber capabable of being reconstructed from other blocks written to other blobbers in an allsocation associated with the first blobber. At step 1120, the process sends read markers for the other blocks to the other blobbers. At step 1130, responsive to detecting the successful completion of the all reads of the other blocks from the other blobbers in the allocation, the process reconstructs the content from the other blocks. FIG. 11 processing thereafter ends at 1140.

Figure 12:
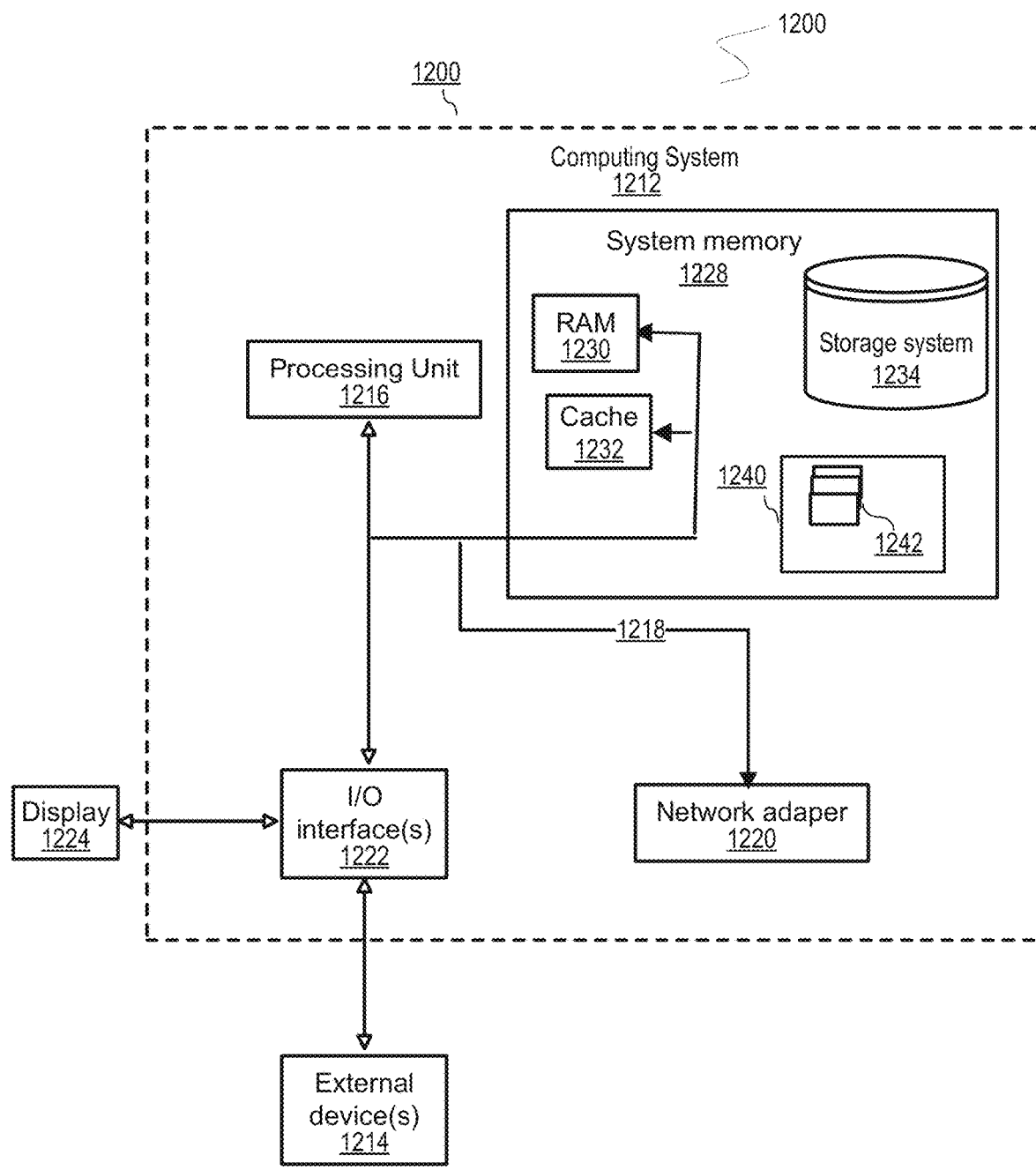
FIG. 12 depicts a schematic view of a processing system wherein the methods of this invention may be implemented.

Referring to FIG. 12, a schematic view of a processing system 1200 is shown wherein the methods of this invention may be implemented. The processing system 1200 is only one example of a suitable system and is not intended to suggest any limitation as to the scope of use or functionality of embodiments of the invention described herein. Regardless, the system 1200 can implement and/or performing any of the functionality set forth herein. In the system 1200 there is a computer system 1212, which is operational with numerous other general purpose or special purpose computing system environments or configurations. Examples of well-known computing systems, environments, and/or configurations that may be suitable for use with the computer system 1212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 1212 may be described in the general context of computer system-executable instructions, such as program modules, being executed by a computer system. Generally, program modules may include routines, programs, objects, components, logic, data structures, and so on that perform tasks or implement abstract data types. The computer system 1212 may be practiced in distributed cloud computing environments where tasks are performed by remote processing devices that are linked through a communications network. In a distributed cloud computing environment, program modules may be in both local and remote computer system storage media including memory storage devices.

As shown in FIG. 10, the computer system 1212 in the system environment 1200 is shown in the form of a general-purpose computing device. The components of the computer system 1212 may include, but are not limited to, a set of one or more processors or processing units 1216, a system memory 1228, and a bus 1218 that couples various system components including the system memory 1228 to the processor 1216.

The bus 1218 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA) bus, the Micro Channel Architecture (MCA) bus, the Enhanced ISA (EISA) bus, the Video Electronics Standards Association (VESA) local bus, and the Peripheral Component Interconnects (PCI) bus.

The computer system 1212 typically includes a variety of computer system readable media. Such media may be any available media that is accessible by the computer system 1212, and it includes both volatile and non-volatile media, removable and non-removable media.

The system memory 1228 can include computer system readable media in the form of volatile memory, such as random-access memory (RAM) 1230 and/or a cache memory 1232. The computer system 1212 may further include other removable/non-removable, volatile/non-volatile computer system storage media. By way of example only, a storage system 1234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1218 by one or more data media interfaces. As will be further depicted and described below, the system memory 1228 may include at least one program product having a set (e.g., at least one) of program modules 1242 that are configured to carry out the functions of embodiments of the invention.

A program/utility 1240, having the set (at least one) of program modules 1242, may be stored in the system memory 1228 by way of example, and not limitation, as well as an operating system, one or more application programs, other program modules, and program data. Each of the operating systems may have one or more application programs, other program modules, and program data or some combination thereof, and may include an implementation of a networking environment. The program modules 1242 generally carry out the functions and/or methodologies of embodiments of the invention as described herein.

The computer system 1212 may also communicate with a set of one or more external devices 1214 such as a keyboard, a pointing device, a display 1224, a tablet, a digital pen, etc. wherein these one or more devices enable a user to interact with the computer system 1212; and/or any devices (e.g., network card, modem, etc.) that enable the computer system 1212 to communicate with one or more other computing devices. Such communication can occur via Input/Output (I/O) interfaces 1222. These include wireless devices and other devices that may be connected to the computer system 1212, such as, a USB port, which may be used by a tablet device (not shown). Still yet, the computer system 1212 can communicate with one or more networks such as a local area network (LAN), a general wide area network (WAN), and/or a public network (e.g., the Internet) via a network adapter 1220. As depicted, a network adapter 1220 communicates with the other components of the computer system 1212 via the bus 1218. It should be understood that although not shown, other hardware and/or software components could be used in conjunction with the computer system 1212. Examples include, but are not limited to microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an", the same holds true for the use in the claims of definite articles.

What is claimed is:

1. A method that includes a processor and a local storage device accessible by the processor executing a request to substitute a first blobber with a second blobber utilizing a blockchain infrastructure comprising:
   Identifying the first blobber to be substituted;
   writing a replace blobber transaction to the blockchain platform indicating the first blobber to be replaced;
   identifying the second blobber replacing the first blobber;
   identifying a content to be written to the second blobber;
   generating write markers with respect to the content for the second blobber;
   transferring the content to the second blobber; and
   responsive to detecting a successful completion of writes of all the content to the second blobber, writing a transaction to drop the first blobber.

2. The method of claim 1, wherein the first blobber failed at least two challenges.

3. The method of claim 1, wherein a client identified the first blobber to be replaced.

4. The method of claim 3, wherein the first blobber passed all challenges.

5. The method of claim 3, wherein the client has the content cached locally and the content is transferred to the second blobber from the local cache.

6. The method of claim 3, wherein the client reads the content from the first blobber prior to writing the content to the second blobber.

7. The method of claim 3, wherein the client constructs the content via erasure code.

8. The method of claim 1, wherein the second blobber submits the write marker to the blockchain and indicates availability for reading the content.

9. The method of claim 1, wherein the content is a plurality of chunks of data written by the first blobber.

10. A method that includes a processor and a local storage device accessible by the processor of bypassing usage of a first blobber in a blockchain platform comprising:
    identifying the first blobber to by-pass usage wherein a content written to the first blobber is capable of being reconstructed from other blocks written to other blobbers in an allocation associated with the first blobber;
    sending read markers for the other blocks to the other blobbers;
    monitoring for a successful completion of all reads of the other blocks from the other blobbers in the allocation; and
    responsive to detecting the successful completion of the all reads of the other blocks from the other blobbers in the allocation, reconstructing the content from the other blocks.

11. The method of claim 10, wherein the first blobber is dropped from the blockchain platform by writing a transaction to the blockchain platform indicating the first blobber to be dropped in the allocation.

12. The method of claim 10, wherein the reconstructed content is written to the second blobber.

13. The method of claim 12, wherein the second blobber is a new blobber added to the blockchain platform by writing a transaction to the blockchain platform indicating the second blobber to be added in the allocation.

14. The method of claim 12, wherein the second blobber is selected from the other blobbers not in the allocation.

15. An information handling system for executing a request to substitute a first blobber with a second blobber utilizing a blockchain infrastructure comprising:
    one or more processors;
    a memory coupled to at least one of the processors;
    a network interface that connects the local device to one or more remote web sites; and
    a set of computer program instructions stored in the memory and executed by at least one of the processors in order to perform actions comprising:
      Identifying the first blobber to be substituted;
      writing a replace blobber transaction to the blockchain platform indicating the first blobber to be replaced;
      identifying the second blobber replacing the first blobber;
      identifying a content to be written to the second blobber;
      generating write markers with respect to the content for the second blobber;
      transferring the content to the second blobber; and responsive to detecting a successful completion of writes of all the content to the second blobber, writing a transaction to drop the first blobber.

16. The information handling system of claim 15, wherein the first blobber failed at least two challenges.

17. The information handling system of claim 15, wherein a client identified the first blobber to be replaced.

18. The information handling system of claim 17, wherein first blobber passed all challenges.

19. The information handling system of claim 17, wherein the client has the content cached locally and the content is transferred to the second blobber from the local cache.

20. The information handling system of claim 17, wherein the client reads the content from the first blobber prior to writing the content to the second blobber.

\* \* \* \* \*